United States Patent
Swenson et al.

(10) Patent No.: US 10,487,780 B2
(45) Date of Patent: Nov. 26, 2019

(54) SYSTEM AND METHOD FOR INCREASING THE EFFICIENCY OF HEATING A CRYOGENIC FLUID FLOWING THROUGH A CONDUIT

(71) Applicant: The Boeing Company, Chicago, IL (US)

(72) Inventors: Kevin Swenson, Long Beach, CA (US); Brian Vaniman, Fountain Valley, CA (US)

(73) Assignee: The Boeing Company, Chicago, IL (US)

( * ) Notice: Subject to any disclaimer, the term of this patent is extended or adjusted under 35 U.S.C. 154(b) by 441 days.

(21) Appl. No.: 15/351,062

(22) Filed: Nov. 14, 2016

(65) Prior Publication Data

US 2018/0135558 A1  May 17, 2018

(51) Int. Cl.
*F02K 9/44* (2006.01)
*F17C 9/00* (2006.01)
(Continued)

(52) U.S. Cl.
CPC ................. *F02K 9/44* (2013.01); *F17C 9/00* (2013.01); *F17C 13/001* (2013.01); *F17C 13/04* (2013.01);
(Continued)

(58) Field of Classification Search
CPC ..... F02K 9/42; F02K 9/44; F02K 9/58; F02K 9/64; F02K 9/972; F17C 13/04; F17C 2221/011; F17C 2221/012; F17C 2227/0304; F17C 2227/039; F17C 2250/0443; F17C 2250/0439; F17C 2250/0631; F17C 2250/0636; F17C 2265/05; F17C 2270/0197; F17C 2205/03
See application file for complete search history.

(56) References Cited

U.S. PATENT DOCUMENTS

| | | | | |
|---|---|---|---|---|
| 5,373,702 A | * | 12/1994 | Kalet | F17C 9/00 123/525 |
| 6,769,242 B1 | * | 8/2004 | Balepin | B64G 1/402 60/204 |
| 9,175,786 B2 | | 11/2015 | Luebbers et al. | |

OTHER PUBLICATIONS

Wikipedia, "Propelling nozzle," retrieved on Sep. 15, 2016.
(Continued)

*Primary Examiner* — William H Rodriguez
*Assistant Examiner* — Kyle Robert Thomas

(57) ABSTRACT

A system for increasing the efficiency of heating cryogenic fluid flowing in a downstream direction through a fluid conduit includes a heating mechanism, an upstream valve, a downstream valve, and a controller. The heating mechanism heats the cryogenic fluid, resulting in conversion of a portion of the cryogenic fluid into a buoyant flow moving in an upstream direction. The upstream valve is located upstream of the heating mechanism and controls an upstream-valve mass flow rate of the cryogenic fluid. The downstream valve is located downstream of the heating mechanism and controls a downstream-valve mass flow rate of the cryogenic fluid. The controller adjusts the upstream valve to a choked position at which: an upstream-valve non-buoyant mass flow rate substantially matches the downstream-valve mass flow rate, and the upstream valve at least partially blocks the buoyant flow from flowing in the upstream direction past the upstream valve.

22 Claims, 10 Drawing Sheets

(51) Int. Cl.
  *F17C 13/00* (2006.01)
  *F17C 13/04* (2006.01)
  *F02K 9/58* (2006.01)

(52) U.S. Cl.
  CPC ........ *F02K 9/58* (2013.01); *F17C 2201/0109* (2013.01); *F17C 2201/054* (2013.01); *F17C 2205/013* (2013.01); *F17C 2205/0326* (2013.01); *F17C 2221/011* (2013.01); *F17C 2221/012* (2013.01); *F17C 2221/033* (2013.01); *F17C 2221/08* (2013.01); *F17C 2223/013* (2013.01); *F17C 2223/0161* (2013.01); *F17C 2223/033* (2013.01); *F17C 2225/013* (2013.01); *F17C 2225/0123* (2013.01); *F17C 2225/033* (2013.01); *F17C 2227/0121* (2013.01); *F17C 2227/0304* (2013.01); *F17C 2227/039* (2013.01); *F17C 2227/0311* (2013.01); *F17C 2227/0334* (2013.01); *F17C 2250/032* (2013.01); *F17C 2250/0439* (2013.01); *F17C 2250/0443* (2013.01); *F17C 2260/02* (2013.01); *F17C 2265/066* (2013.01); *F17C 2270/0197* (2013.01); *Y02E 60/321* (2013.01)

(56) References Cited

OTHER PUBLICATIONS

Vacco, "12" Cryogenic Prevalve, dated Jan. 2012.
Egger, "Iris diaphragm control valve," dated Sep. 2016.
EPO, European Search Report, Appl. No. EP1719038, dated Dec. 8, 2017.

\* cited by examiner

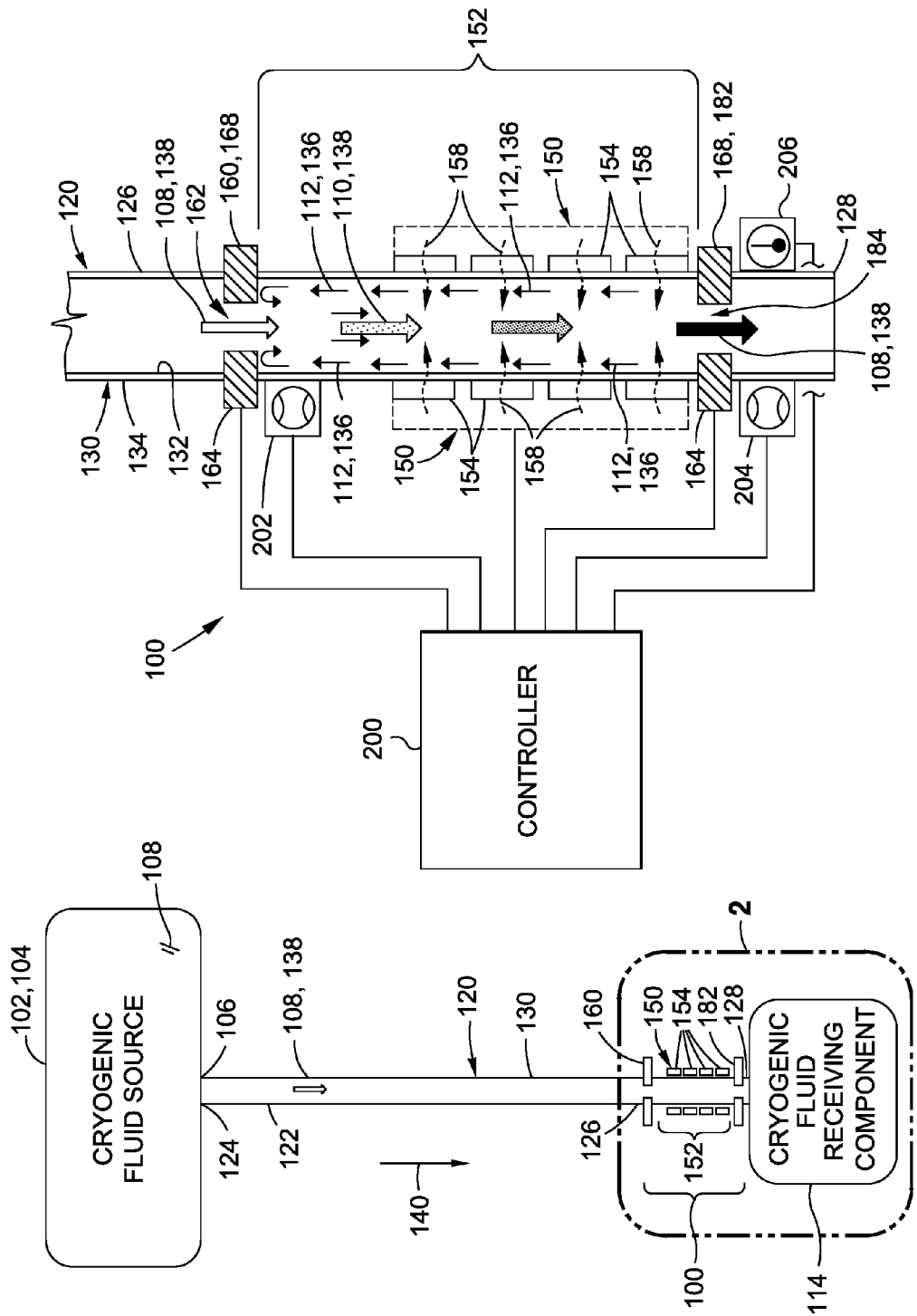

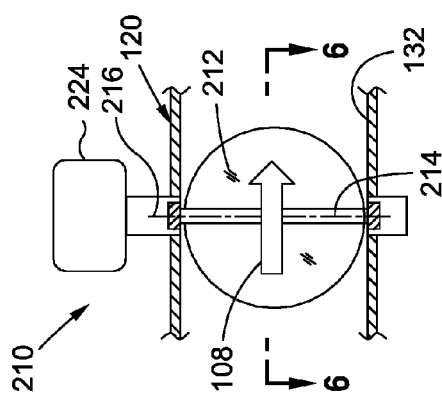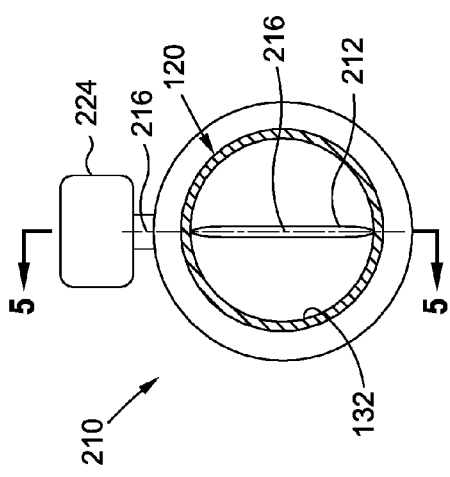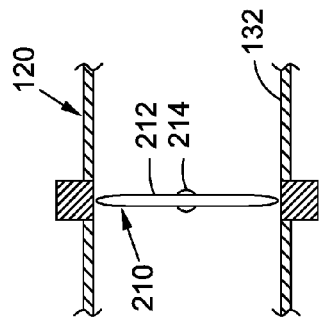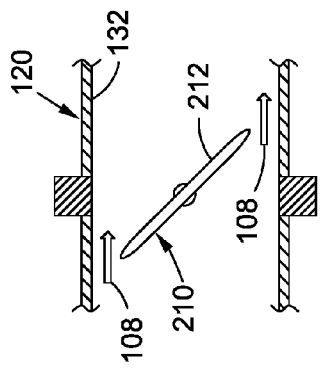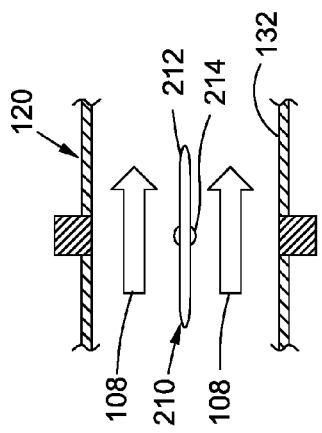

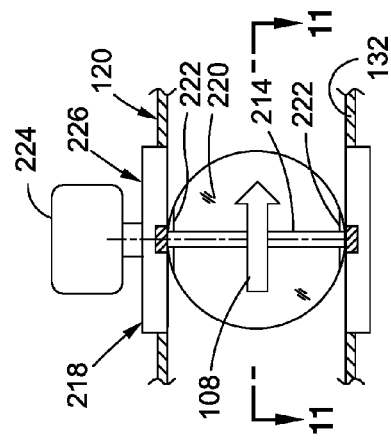
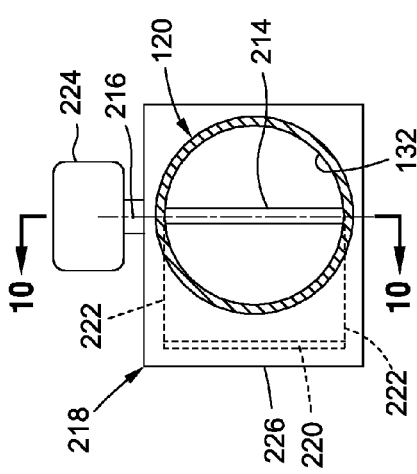
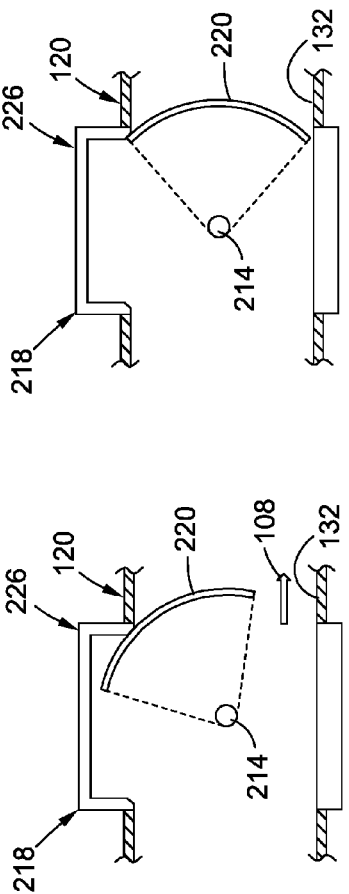
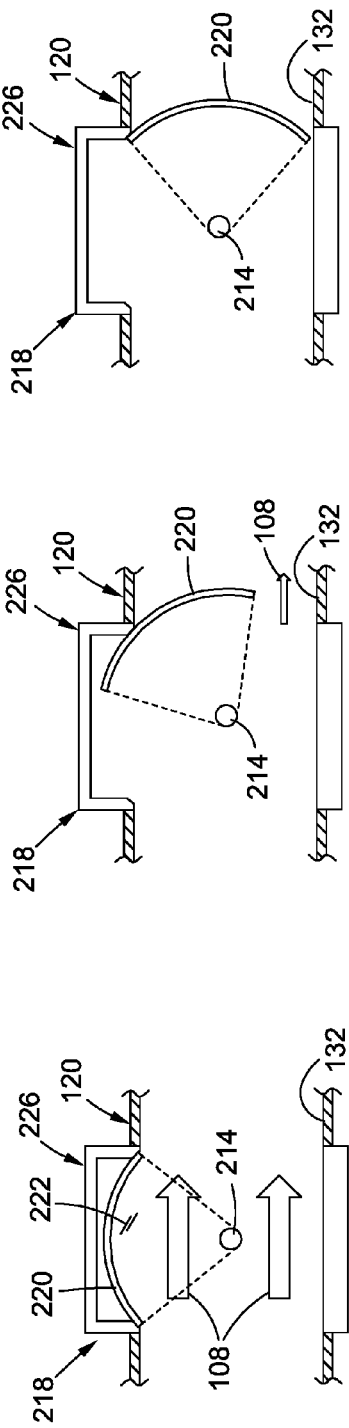

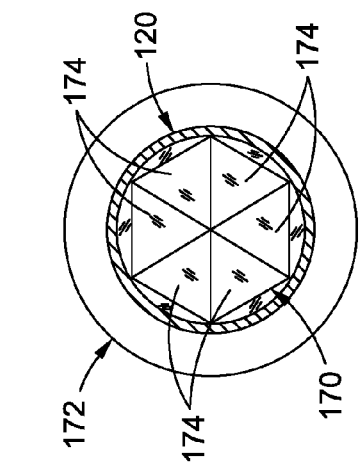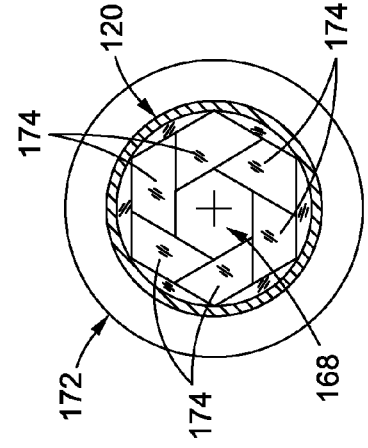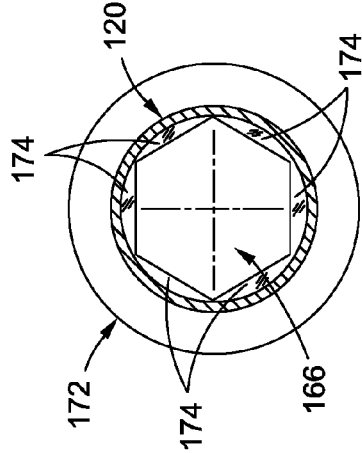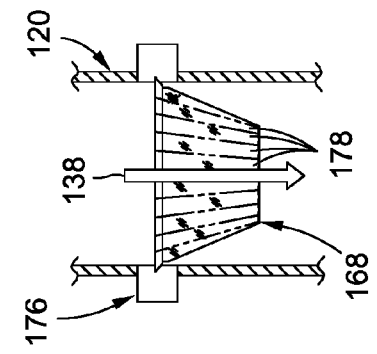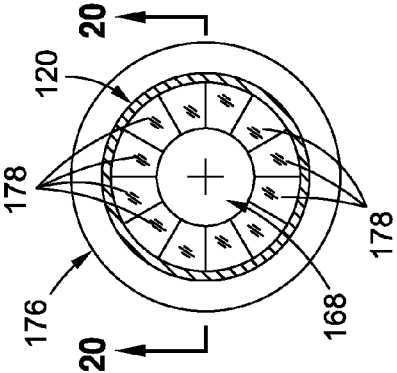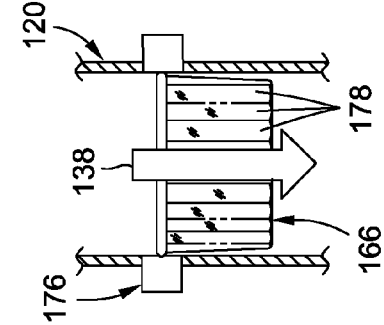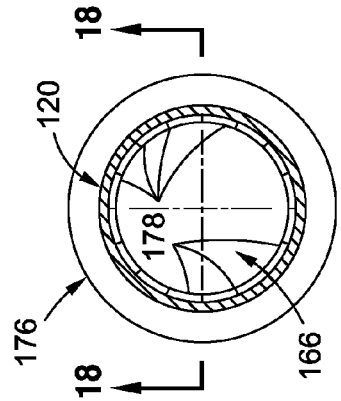

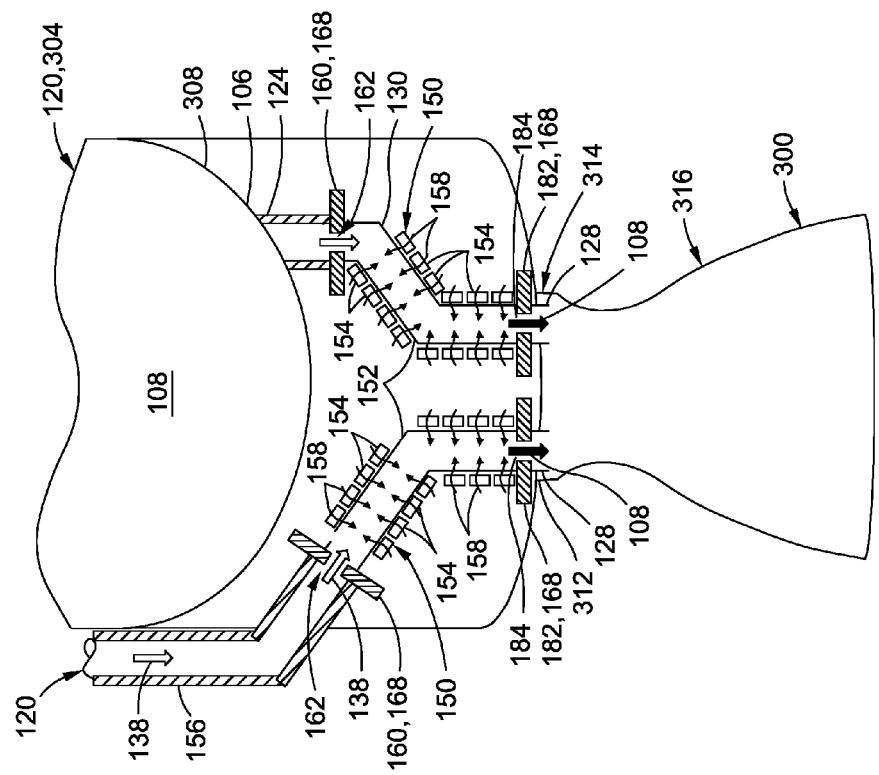
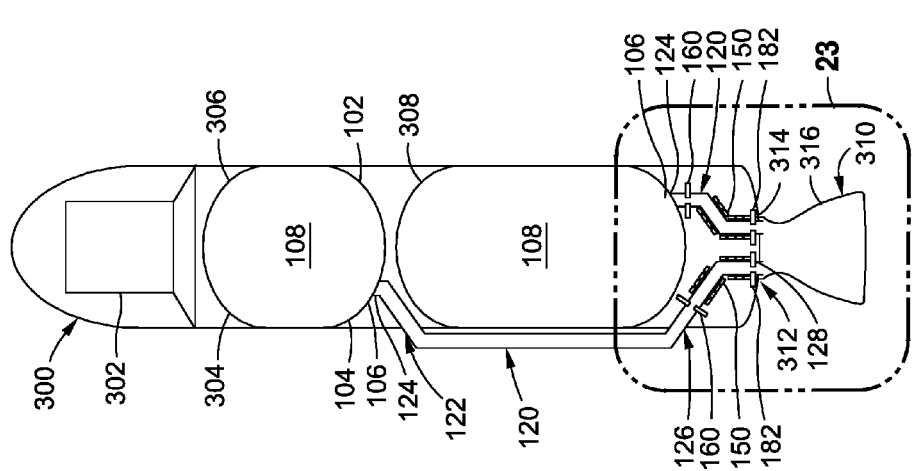

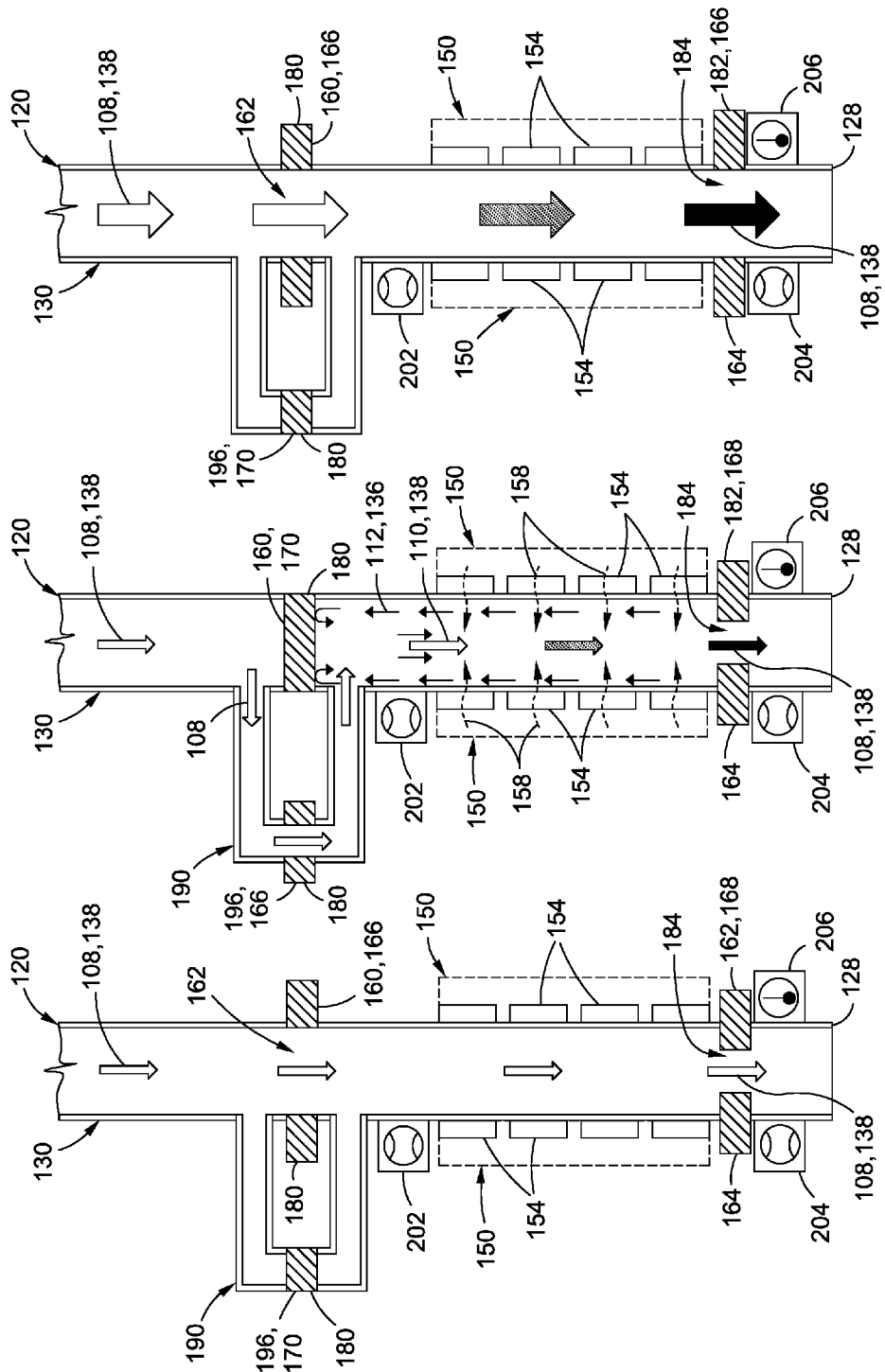

SYSTEM AND METHOD FOR INCREASING THE EFFICIENCY OF HEATING A CRYOGENIC FLUID FLOWING THROUGH A CONDUIT

FIELD

The present disclosure relates generally to cryogenic fluids and, more particularly, to a system and method for increasing the efficiency of heating cryogenic fluid flowing through a conduit.

BACKGROUND

Certain applications require that fluid flowing through a conduit is heated prior to the fluid flowing into a component at a downstream end of the conduit. For example, a space launch vehicle with a liquid propellant rocket engine requires that cryogenic oxidizer (e.g., liquid oxygen—LOX) and cryogenic fuel (e.g., liquid hydrogen—$LH_2$) are heated just prior to entering the engine section to ensure quality of ignition and combustion during an engine start. Heating cryogenic propellants is complicated by the fact that the cryogenic propellant tanks are located above the engine. For example, LOX may flow downwardly through a relatively large diameter conduit from a LOX tank located a significant distance (e.g., up to 100 feet or more) above the engine.

Due to the relatively large diameter of the conduit and the initially low flow requirements for engine start, the LOX is initially relatively slow moving through the conduit. During heating of the LOX by heaters located outside the conduit, the LOX immediately adjacent the inner surface of the conduit wall is converted into a relatively low density buoyant flow that moves upwardly along the conduit inner surface, while a remainder of the higher density heated LOX flows downwardly into the engine. Due to the relatively large diameter of the conduit and the relatively low flow rate of the LOX, the upwardly-moving buoyant flow draws a portion of the heated LOX upwardly through the conduit.

The net effect of the upward flow of heated LOX is a loss in the efficiency of the heaters, requiring an increase in the power output of the heaters and/or an increase in the quantity of heaters as a means to heat the LOX to the required temperature for engine start. Unfortunately, increasing the power level of the heaters reduces the operating efficiency of the engine start system. Increasing the quantity of heaters increases the cost and weight of the launch vehicle. In addition, the power density of the heaters can reach a maximum point where no additional heat can be added to the LOX. Furthermore, a portion of heated LOX moving upwardly through the conduit may flow into the LOX tank and heat the bulk liquid in the tank, resulting in a reduction in the density of the bulk liquid and a corresponding reduction in the amount of available propellant mass. The reduction in propellant mass reduces the amount of payload that can be launched into space.

As can be seen, there exists a need in the art for a system and method for increasing the efficiency of heating cryogenic fluid flowing in a conduit.

SUMMARY

The above-noted needs associated with increasing the efficiency of heating cryogenic fluid flowing in a conduit are addressed and alleviated by the present disclosure which, in an embodiment, provides a system including a heating mechanism, an upstream valve, a downstream valve, and a controller. The heating mechanism heats cryogenic fluid flowing in a downstream direction through the fluid conduit, resulting in the conversion of a portion of the cryogenic fluid into a buoyant flow which moves in an upstream direction. The upstream valve is located upstream of the heating mechanism and controls an upstream-valve mass flow rate of the cryogenic fluid. The upstream-valve mass flow rate comprises an upstream-valve non-buoyant mass flow rate of cryogenic fluid flowing through the upstream valve in the downstream direction minus an upstream-valve buoyant mass flow rate of any buoyant flow flowing past the upstream valve in the upstream direction. The downstream valve is located downstream of the heating mechanism and controls a downstream-valve mass flow rate of the cryogenic fluid. The controller adjusts the upstream valve to a choked position at which: the upstream-valve non-buoyant mass flow rate substantially matches the downstream-valve mass flow rate, and the upstream valve at least partially blocks the buoyant flow from flowing in the upstream direction past the upstream valve.

Also disclosed is a space launch vehicle including a cryogenic tank, a rocket engine, a fluid conduit for transferring cryogenic fluid flowing in a downstream direction from the cryogenic tank to the rocket engine, and a system for heating the cryogenic fluid. The system includes a heating mechanism located on a downstream portion of the fluid conduit and which is configured to heat the cryogenic fluid, resulting in the conversion of a portion of the cryogenic fluid into a buoyant flow moving in an upstream direction. The upstream valve is mounted to the fluid conduit at a location upstream of the heating mechanism and is operable for controlling an upstream-valve mass flow rate of the cryogenic fluid. The downstream valve is located downstream of the heating mechanism and is operable for controlling a downstream-valve mass flow rate of the cryogenic fluid. The controller is configured to adjust the upstream valve to a choked position at which: the upstream-valve non-buoyant mass flow rate substantially matches the downstream-valve mass flow rate, and the upstream valve at least partially blocks the buoyant flow from flowing in the upstream direction past the upstream valve.

In addition, disclosed is a method of heating cryogenic fluid. The method includes receiving, in a fluid conduit, cryogenic fluid at a conduit upstream end fluidly coupled to a cryogenic fluid source. The cryogenic fluid flows through the fluid conduit in a downstream direction toward a conduit downstream end. The method additionally includes heating the cryogenic fluid using a heating mechanism located within a heat transfer zone of the fluid conduit between an upstream valve and a downstream valve. The method also includes converting, within the heat transfer zone, a portion of the cryogenic fluid into a buoyant flow as a result of heating the cryogenic fluid. The buoyant flow moves in an upstream direction. The method further includes adjusting, using a controller, the upstream valve until an upstream-valve non-buoyant mass flow rate of the cryogenic fluid through the upstream valve substantially matches a downstream-valve mass flow rate of the cryogenic fluid through the downstream valve in a choked position. In addition, the method includes preventing, using the upstream valve, at least a portion of the buoyant flow from flowing past the upstream valve in the upstream direction while the cryogenic fluid flows into the heat transfer zone in the downstream direction, thereby reducing heat loss from the cryogenic fluid otherwise occurring if the buoyant flow moved past the upstream valve.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is an illustration of an example of a fluid conduit fluidly coupled to a cryogenic fluid source, and a lower portion of the fluid conduit including the presently-disclosed system comprising an upstream valve, a downstream valve, and a heating mechanism for heating cryogenic fluid flowing through the fluid conduit prior to exiting the conduit downstream end;

FIG. 2 is a magnified view of a lower portion of the fluid conduit illustrating a controller for controlling the upstream valve, the downstream valve, and the heating mechanism comprised of one or more powered heating devices for heating the cryogenic fluid within a heat transfer zone between the upstream valve and the downstream valve;

FIG. 4 is a cross-sectional view of an example of a valve (e.g., the upstream valve, the downstream valve) configured as a butterfly valve having a disc pivotable about a pivot axis extending across a diameter of the fluid conduit;

FIG. 5 is a side-sectional view of the butterfly valve taken along line 5 of FIG. 4 and illustrating the butterfly valve in a fully open position;

FIG. 6 is a top sectional view of the butterfly valve taken along line 6 of FIG. 5 and illustrating the butterfly valve in the fully open position;

FIG. 7 is a top sectional view of the butterfly valve of FIG. 5 shown in a choked position;

FIG. 8 is a top sectional view of the butterfly valve of FIG. 5 shown in a fully closed position;

FIG. 9 is a cross-sectional view of an example of a valve (e.g., the upstream valve, the downstream valve) configured as a visor valve having a visor element pivotable about a pivot axis extending across a diameter of the fluid conduit;

FIG. 10 is a side-sectional view of the visor valve taken along line 10 of FIG. 9 and illustrating the visor valve in a fully open position;

FIG. 11 is a top sectional view of the visor valve taken along line 11 of FIG. 10 and illustrating the visor valve in the fully open position;

FIG. 12 is a top sectional view of the visor valve of FIG. 10 shown in the choked position;

FIG. 13 is a top sectional view of the visor valve of FIG. 10 shown in a fully closed position;

FIG. 14 is a cross-sectional view of an example of a valve (e.g., the upstream valve, the downstream valve) configured as an iris diaphragm valve shown in a fully open position;

FIG. 15 is a cross-sectional view of the iris diaphragm valve of FIG. 14 shown in a choked position;

FIG. 16 is a cross-sectional view of the iris diaphragm valve of FIG. 14 shown in a fully closed position;

FIG. 17 is a cross-sectional view of a valve configured as a variable aperture nozzle shown in a fully open position;

FIG. 18 is a side sectional view of the variable aperture nozzle of FIG. 17 shown in the fully open position;

FIG. 19 is a cross-sectional view of the variable aperture nozzle of FIG. 17 shown in a choked position;

FIG. 20 is a side sectional view of the variable aperture nozzle of FIG. 19 shown in the choked position;

FIG. 22 is an illustration of an example of a launch vehicle having cryogenic propellant tanks each fluidly coupled to a rocket engine by a fluid conduit;

FIG. 23 is a magnified view of an engine section of the launch vehicle of FIG. 22 illustrating an upstream valve, a downstream valve, and a heating mechanism controlled by a controller in a manner increasing the efficiency of heating the cryogenic fluid prior to entering the rocket engine;

FIG. 28 is a schematic view of the fluid conduit of FIG. 21 illustrating a bypass valve in a fully closed position and the upstream valve in a fully open position;

FIG. 29 is a schematic view of the fluid conduit of FIG. 28 illustrating the heating devices activated to heat the cryogenic fluid, and further illustrating the bypass valve in the fully open position and the upstream valve in the fully closed position allowing the upstream valve to block a buoyant flow of cryogenic fluid flowing in the upstream direction;

FIG. 30 is a schematic view of the fluid conduit of FIG. 28 illustrating the heating devices deactivated upon the cryogenic fluid reaching a desired downstream cryogenic fluid temperature, and further illustrating the bypass valve in a fully closed position and the upstream valve and downstream valve each in a fully open position to accommodate an increase in the mass flow rate of the cryogenic fluid.

DETAILED DESCRIPTION

Figure 3:
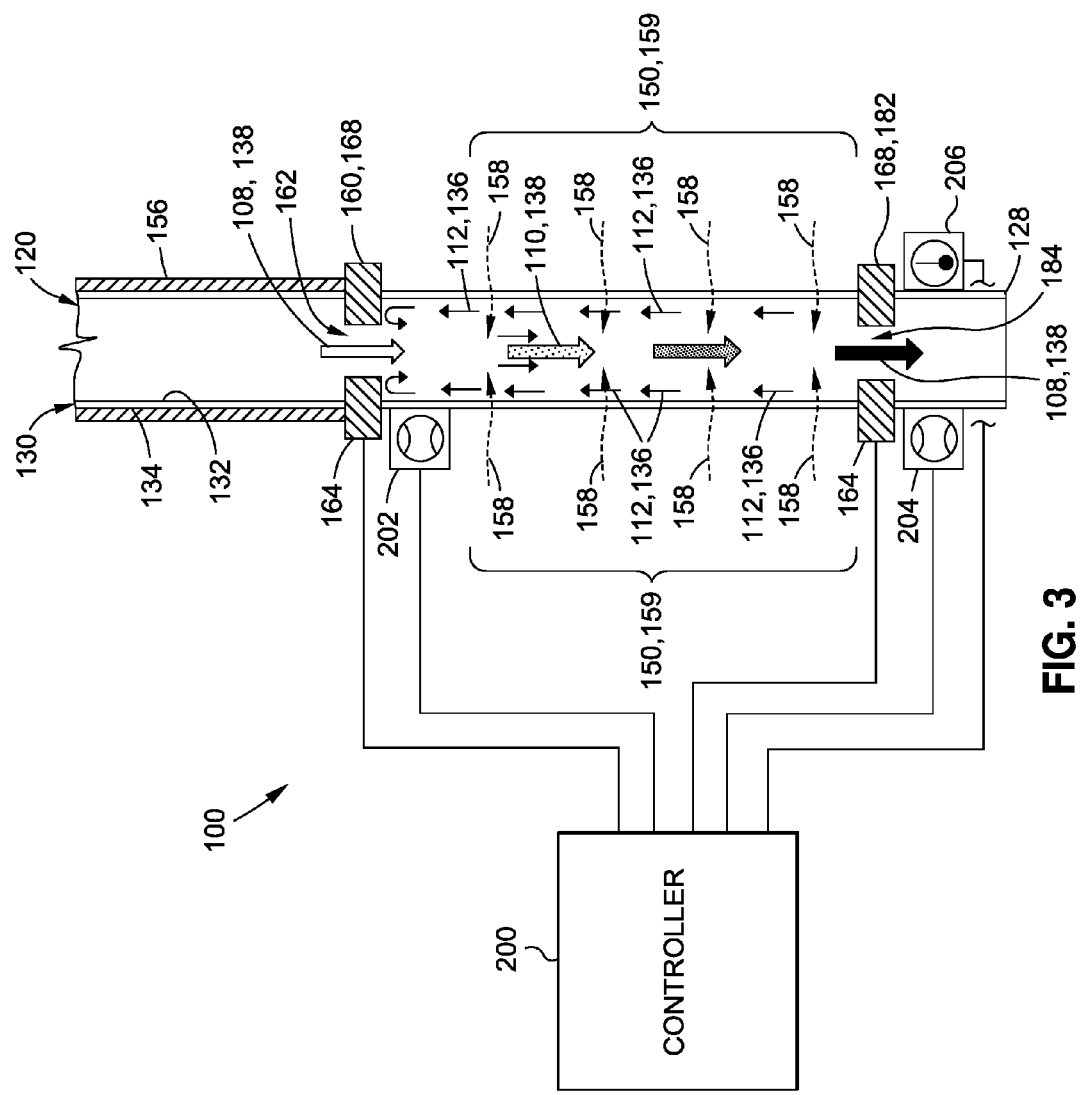
FIG. 3 is a schematic view of an example of a fluid conduit wherein the heating mechanism comprises a lack of thermal insulation on at least a portion of the fluid conduit within the heat transfer zone.

Referring now to the drawings wherein the showings are for purposes of illustrating preferred and various embodiments of the disclosure, shown in FIG. 1 is an example of a fluid conduit 120 for transferring cryogenic fluid 108 from a cryogenic fluid source 102 to a cryogenic fluid receiving component 114. A lower portion of the fluid conduit 120 includes an upstream valve 160, a downstream valve 182, and a heating mechanism 150 located within a heat transfer zone 152 extending between the upstream valve 160 and the downstream valve 182. As described in greater detail below, the upstream valve 160, the downstream valve 182, and the heating mechanism 150 are part of a system 100 that includes a controller 200 (FIG. 2) for controlling the upstream valve 160, downstream valve 182, and heating mechanism 150 in a manner to efficiently heat the cryogenic fluid 108 within the heat transfer zone 152 prior to the cryogenic fluid 108 exiting the conduit downstream end 128 and flowing into the cryogenic fluid receiving component 114.

Referring to FIGS. 1-2, the upstream valve 160, the downstream valve 182, and the heating mechanism 150 are operated in a manner that reduces or prevents heat loss from a buoyant flow 112 of cryogenic fluid 108 that forms along the conduit wall 130 within the heat transfer zone 152 during heating of the cryogenic fluid 108. In this regard, during heating, the cryogenic fluid 108 nearest the conduit inner surface 132 is warmer than a downstream-moving main flow 110 of cryogenic fluid 108 located toward the center of the fluid conduit 120. The heating of the cryogenic fluid 108 against the conduit inner surface 132 causes the cryogenic fluid 108 to naturally separate into the buoyant flow 112 which moves in the upstream direction 136 due to temperature-induced differences in density between the buoyant flow 112 and the cooler main flow 110 of cryogenic fluid 108 moving in the downstream direction 138, as described in greater detail below. Advantageously in the presently-disclosed system 100, the upstream valve 160 is operated in a manner to impede or block the buoyant flow 112 from moving past the upstream valve 160, thereby reducing or preventing heat loss from the main flow 110 of cryogenic fluid 108 moving in the downstream direction 138, and resulting in an increase in the efficiency with which the cryogenic fluid 108 is heated.

In FIG. 1, the fluid conduit 120 has an upstream portion 122 terminating at a conduit upstream end 124, a downstream portion 126 terminating at a conduit downstream end 128, and a conduit wall 130 having a conduit inner surface 132 (FIG. 2), and a conduit outer surface 134 (FIG. 2). The conduit upstream end 124 is fluidly coupled to the cryogenic fluid source 102 containing cryogenic fluid 108. The cryogenic fluid 108 may include any type of fluid having a relatively low boiling point (e.g., below 120 degrees K). In some examples, the cryogenic fluid 108 may include cryogenic propellants including, but not limited to, liquefied gases such as liquid oxygen (LOX), liquid hydrogen (LH$_2$), liquid methane or liquefied natural gas (LNG), or any other type of liquefied oxidizer and/or liquefied fuel that may be used as a cryogenic propellant for a rocket engine 310 (FIG. 22) for a launch vehicle 300 (FIG. 22) or for any other type of application that uses cryogenic fluid 108. The cryogenic fluid source 102 may be a cryogenic tank 104 such as a propellant tank 304 (FIG. 22) having a tank outlet 106 (FIG. 22) coupled to the conduit upstream end 124.

The conduit upstream end 124 receives cryogenic fluid 108 which flows through the fluid conduit 120 under an acceleration force 140 such as the gravitational force of a planetary body (e.g., Earth), or any other type of acceleration force 140 that causes the cryogenic fluid 108 to flow through the fluid conduit 120 in a downstream direction 138. In the example of a spacecraft in a micro-gravity or zero-gravity environment, an acceleration force 140 may be generated by the firing of one or more thrusters (not shown) of the spacecraft in a direction generally parallel to the downstream direction 138 of the fluid conduit 120. The thrusters may be fired for a period of time prior to starting a main engine of the spacecraft. The firing of the thrusters may cause the cryogenic fluid 108 to flow through the fluid conduit 120 along the downstream direction 138.

The fluid conduit 120 may be straight and/or the fluid conduit 120 may have one or more turns or bends along the lengthwise direction of the fluid conduit 120 between the cryogenic fluid source 102 and the cryogenic fluid receiving component 114. In some examples, at least a portion of the fluid conduit 120 may be oriented generally parallel to a direction of the acceleration force 140. In some examples, at least a portion of the fluid conduit 120 may be vertically oriented (e.g., FIG. 22) in the sense that at least a portion of the fluid conduit 120 is parallel to a gravitational force. The fluid conduit 120 may be oriented within approximately 80 degrees of the direction of the acceleration force 140 (e.g., gravitational force). For a vertical-takeoff launch vehicle 300 (e.g., FIG. 22) on a launch pad, at least a portion of the fluid conduit 120 may be oriented approximately vertically (e.g., ±10 degrees), and no less than approximately 10 degrees from horizontal.

In the example of a launch vehicle 300, the fluid conduit 120 may be function as a propellant feedline for carrying cryogenic propellant. For example, the fluid conduit 120 may be an oxidizer feedline or a fuel feedline. The fluid conduit 120 may have a circular cross-section or the cross-section of the fluid conduit 120 may have any one of a variety of non-circular shapes and may be provided in any one a variety of sizes. For example, in a launch vehicle 300, the fluid conduit 120 for LOX may have an inner diameter of approximately 12 inches or more. The diameter of the fluid conduit 120 may be dependent upon the required mass flow rate of a downstream cryogenic fluid receiving component 114, such as a rocket engine 310 in the example of a launch vehicle 300 (FIG. 22).

FIG. 2 is a magnified view of the lower portion of the fluid conduit 120 illustrating the presently-disclosed system 100 including the controller 200 communicatively coupled to the upstream valve 160, the downstream valve 182, and the heating mechanism 150. The heating mechanism 150 is located in the heat transfer zone 152 of the fluid conduit 120 and is configured to heat the cryogenic fluid 108, illustrated as progressively darker-shaded arrows corresponding to the increasing temperature of the cryogenic fluid 108 passing through the heat transfer zone 152. In some examples, the heating mechanism 150 heats the conduit wall 130, resulting in a layer of cryogenic fluid 108 immediately adjacent the conduit inner surface 132 being converted into the buoyant flow 112 which moves in the upstream direction 136, as mentioned above. A remaining portion of the cryogenic fluid 108 (i.e., the main flow 110) flows through the heat transfer zone 152 in the downstream direction 138 toward the conduit downstream end 128.

In FIG. 2, the heating mechanism 150 may be configured as one or more powered heating devices 154 for actively heating the cryogenic fluid 108 passing through the heat transfer zone 152 of the fluid conduit 120. The powered heating devices 154 shown in FIG. 2 may be associated with, coupled to, mounted on, and/or positioned around the conduit outer surface 134 in the heat transfer zone 152. In one example, the powered heating devices 154 may be circumferentially spaced around the fluid conduit 120, and may be spaced along a lengthwise portion of the heat transfer zone 152, or the heat transfer devices may be spaced along the entire length of the heat transfer zone 152 from the upstream valve 160 to the downstream valve 182. The total quantity of heating devices 154 and the heat output capability of each heating device 154 may be dependent upon the composition of the cryogenic fluid 108, the maximum mass flow rate of the cryogenic fluid 108 through the fluid conduit 120, the amount by which the temperature of the cryogenic fluid 108 must be increased as the cryogenic fluid 108 passes along the heat transfer zone 152, and other factors.

In one example, the heating devices 154 may be provided as one or more resistance wires (not shown) wrapped around the conduit outer surface 134 or incorporated into the conduit wall 130 for heating the fluid conduit 120. In another example, the heating devices 154 may be provided as one or more metallic clamp heaters (not shown) clamped to the conduit outer surface 134 along the heat transfer zone 152. In still another example, the heating devices 154 may be provided as a plurality of radiative heating devices such as infrared heating devices. The radiative heating devices may be provided in any one or more of a variety of configurations. In one example, the heating devices 154 may be configured to heat the cryogenic fluid 108 by nucleate boiling.

In FIG. 3, shown is an example of a fluid conduit 120 covered with thermal insulation 156 in the section outside of the heat transfer zone 152. The fluid conduit 120 has reduced thermal insulation 156 or no thermal insulation 156 within the heat transfer zone 152. The thermal insulation 156 may comprise foam insulation such as polymeric spray-on foam covering the conduit outer surface 134. Alternatively or additionally, the thermal insulation 156 may be a vacuum jacket, multi-layered insulation, and/or any other type of thermal insulation 156. Within the heat transfer zone 152, the fluid conduit 120 may be at least partially devoid of thermal insulation 156, and/or the thermal insulation 156 within the transfer zone may have reduced effectiveness such as due to reduced insulation thickness and/or due to reduced insulative capability of the thermal insulation 156. By reducing or omitting thermal insulation 156 from the heat transfer zone 152, a passive heating mechanism 150 is provided, allowing for environmental heating 159 of the conduit wall 130, and resulting in conductive heating of the cryogenic fluid 108 passing through the heat transfer zone 152.

Referring still to FIG. 3, environmental heating 159 of an exposed fluid conduit 120 (e.g., non-insulated) or a reduced-insulation fluid conduit 120 may be provided by any number of environmental heating sources (not shown) including, but not limited to, ambient air heating, solar radiative heating, and/or radiative heating from structures located in close proximity to the heat transfer zone 152. For example, radiative heating may emitted by conduit support structure, tank support structures, the rocket engine 310, and/or associated engine components. The thermal insulation 156 may be locally reduced or altogether omitted from the heat transfer zone 152 in a manner increasing the environmental heating 159 of the fluid conduit 120 within the heat transfer zone 152 relative to the amount of environmental heating 159 of the insulated fluid conduit 120 outside of the heat transfer zone 152. Although not shown, a passive heating mechanism 150 may optionally include one or more movable heat shields that may be controlled by the controller 200 to move the heat shields between a shielded position, in which the reduced-insulation or non-insulated heat transfer zone 152 is shielded from environmental heating 159, and a non-shielded position, in which the reduced-insulation or non-insulated heat transfer zone 152 is exposed to environmental heating 159.

Referring again to FIG. 2, the system 100 includes the upstream valve 160 coupled to or integrated into the fluid conduit 120 immediately upstream of the heating mechanism 150. The upstream valve 160 is operable to control an upstream-valve mass flow rate of the cryogenic fluid 108 flowing in the downstream direction 138 through the upstream valve 160. The upstream-valve mass flow rate comprises an upstream-valve non-buoyant mass flow rate of cryogenic fluid 108 flowing through the upstream valve 160 in the downstream direction 138 minus an upstream-valve buoyant mass flow rate of any buoyant flow 112 flowing past the upstream valve 160 in the upstream direction 136. In the presently-disclosed system 100 and method, the upstream valve 160 is operated in a manner that restricts, reduces, or prevents buoyant flow 112 from moving past the upstream valve 160 along the upstream direction 136.

The system 100 additionally includes the downstream valve 182 located downstream of the heating mechanism 150. In some embodiments as shown in FIGS. 1-3, the downstream valve 182 may be coupled to or integrated into the fluid conduit 120 immediately downstream of the heating mechanism 150. In other examples not shown, the downstream valve 182 may comprise one or more valves of the cryogenic fluid receiving component 114 and/or one or more valves located downstream of the cryogenic fluid receiving component 114. For example, in an embodiment where the cryogenic fluid receiving component 114 is a rocket engine 310 (FIGS. 22-23) of a launch vehicle (FIG. 22), the downstream valve 182 may comprise a combination of one or more valves (not shown) in the engine 310 and/or one or more valves of a ground system (not shown) located downstream of the rocket engine 310. In an embodiment, the downstream valve 182 may comprise an engine bleed system valve (not shown) of the ground system, and may be operated in a manner to regulate engine bleed flow of cryogenic propellant prior to engine ignition. Regardless of location, the downstream valve 182 of the presently-disclosed system 100 is configured to control a downstream-valve mass flow rate of the cryogenic fluid 108 flowing through the downstream valve 182 in the downstream direction 138.

In some examples, the upstream valve 160 and/or the downstream valve 182 may be a variable-opening valve 164. A variable-opening valve 164 is adjustable between a fully open position 166, a fully closed position 170, and any one of an infinite variety of choked positions 168 (e.g., partially open positions) between the fully open position 166 and the fully closed position 170. In the fully open position 166, the cryogenic fluid 108 flows unimpeded through the variable-opening valve 164. In the fully open position 166, the cryogenic fluid 108 is prevented from flowing through the variable-opening valve 164. The valve opening of the variable-opening valve 164 may remain centered relative to a cross-sectional center of the fluid conduit 120 when adjusted to any one of a variety of different opening sizes (e.g., opening width or effective opening diameter). Alternatively, in another example of the presently-disclosed system 100 shown in FIG. 21 and described below, the upstream valve 160 may be an open-close valve 180 which is movable either to a fully open position 166 or to a fully closed position 170, and is non-adjustable to a choked position 168 (e.g., a partially open position). An open-close valve 180 may be less complex and therefore less costly and simpler to operate than a variable-opening valve 164.

FIGS. 4-8 illustrate an example of a valve (e.g., the upstream valve 160, the downstream valve 182) configured as a butterfly valve 210 which may be operated either as a variable-opening valve 164 or as an open-close valve 180. FIG. 4 is a cross-sectional view of the butterfly valve 210 which includes a disc 212 that may be coupled to a shaft 214 extending between diametrically opposing sides of the butterfly valve 210. The butterfly valve 210 may include an actuator 224 for rotating the shaft 214. The disc 212 may be sized and configured complementary to the inner diameter of the valve body (not shown) which may be substantially equivalent to the diameter of the conduit inner surface 132 of the fluid conduit 120. When the butterfly valve 210 is in the fully closed position 170 (FIG. 8), the edges of the disc 212 are sealed against the valve inner surfaces (not shown), thereby preventing the flow of cryogenic fluid 108 through the butterfly valve 210.

FIG. 5 is a side-sectional view of the butterfly valve 210 in a fully open position 166, and illustrating the profile of the disc 212 which, in the example shown, has a circular shape. The shaft 214 may be supported by a pair of bearings located at diametrically opposing sides of the fluid conduit 120. FIG. 6 shows the butterfly valve 210 in a fully open position 166 allowing for generally unrestricted flow of cryogenic fluid 108 through the butterfly valve 210. FIG. 7 shows the butterfly valve 210 in a choked position 168 wherein the disc 212 is oriented non-parallel and non-perpendicular relative to an axis of the butterfly valve 210, and thereby at least partially blocking the flow of cryogenic fluid 108 through the butterfly valve 210. FIG. 8 shows the butterfly valve 210 in a fully closed position 170 in which the flow of cryogenic fluid 108 through the butterfly valve 210 is completely blocked. The actuator 224 may be commanded by the controller to rotate the shaft 214 about the pivot axis 216 to change the orientation of the disc 212 between the fully open position 166, the fully closed position 170, or any one of an infinite variety of choked positions 168.

FIGS. 9-13 illustrate an example of a valve (e.g., the upstream valve 160, the downstream valve 182) configured as a visor valve 218 which may be operated either as a variable-opening valve 164 or as an open-close valve 180. FIG. 9 is a cross-sectional view of the visor valve 218 which may include a visor element 220. A pair of visor mounting arms 222 may couple the visor element 220 to a shaft 214 extending across a diameter of the visor valve 218. The visor valve 218 may further include an actuator 224 for rotating the shaft 214 to change the orientation of the visor element 220 in response to commands from the controller 200. In this regard, the visor element 220 may be moved between the fully open position 166, the fully closed position 170, or any one of an infinite variety of choked positions 168.

FIG. 10 is a side-sectional view of the visor valve 218 in a fully open position 166 and further illustrating the visor element 220 mounted to the shaft 214. FIG. 11 is a top sectional view of the visor valve 218 illustrating an example of a visor element 220 having an arcuate shape. When the visor element 220 is in the fully open position 166, the visor element 220 may be rotated into a cavity in the valve housing 226 and allowing cryogenic fluid 108 to flow unrestricted through the visor valve 218. FIG. 12 shows the visor valve 218 in the choked position 168 wherein the flow of cryogenic fluid 108 through the visor valve 218 is partially impeded or blocked. FIG. 13 shows the visor valve 218 in the fully closed position 170 wherein the visor element 220 is sealed to the visor valve 218 in a manner preventing the flow of cryogenic fluid 108 through the visor valve 218.

FIGS. 4-13 illustrate two examples of any one of a variety of valve configurations in which the valve opening is non-centered when the valve is in a choked position 168 (e.g., partially open position), and remains non-centered during adjustment of the size of the valve opening to a choked position 168. For example, the above-described butterfly valve 210 shown in FIGS. 4-8 provides openings on diametrically-opposed sides of the disc 212 when the disc 212 is in the choked position 168 as shown in FIG. 7. Likewise, the above-described visor valve 218 shown in FIGS. 9-13 has a non-centered-opening when the visor element 220 is in a choked position 168 as shown in FIG. 12. However, a non-centered-opening of the upstream valve 160 may impede or block at least a portion of the buoyant flow 112. For example, when the butterfly valve 210 or the visor valve 218 is in a choked position 168, at least a portion of the respective disc 212 (FIG. 5) or visor element 220 (FIG. 12) may be in close proximity to or in direct contact with the valve inner surface (not shown), and may thereby block at least a portion of the peripherally-located buoyant flow 112. In this regard, although a non-centered-opening may not directly physically block the buoyant flow 112, the choked position 168 may result in a reduction in cross-sectional flow area through the upstream valve 160 which may increase the velocity of the cryogenic fluid 108 to a point that the increased-velocity cryogenic fluid 108 moving in the downstream direction 138 through the upstream valve 160 mixes or interacts with the peripherally-located buoyant flow 112 and thereby overcomes and/or prevents the buoyant flow 112 from passing upstream of the upstream valve 160.

FIGS. 14-16 illustrate an example of a variable-opening valve 164 configured as an iris diaphragm valve 172 which may be operated either as a variable-opening valve 164 or as an open-close valve 180. In the example shown, the iris diaphragm valve 172 has a set of overlapping leaves 174 which are each pivotable within a plane (not shown) oriented transverse to a conduit axis (not shown) of the fluid conduit 120. FIG. 14 shows the iris diaphragm valve 172 in a fully open position 166. FIG. 15 shows the iris diaphragm valve 172 in a choked position 168 (e.g., a partially open position). FIG. 16 shows the iris diaphragm valve 172 in a fully closed position 170. When the iris diaphragm valve 172 is commanded by the controller 200 to change the size of the valve opening, the leaves 174 of the iris diaphragm valve 172 may each pivot by the same amount which advantageously results in the valve opening remains centered relative to the cross-sectional center of the fluid conduit 120, regardless of the size of the valve opening.

FIGS. 17-19 illustrate an example of a variable-opening valve 164 configured as a variable aperture nozzle 176 which may also be operated either as a variable-opening valve 164 or as an open-close valve 180. In the example shown, the variable aperture nozzle 176 has a set of overlapping petals 178 which are each pivotable about an axis incident on a plane oriented transverse to the conduit axis of the fluid conduit 120. FIG. 17 shows the variable aperture nozzle 176 in a fully open position 166. FIG. 18 is a side sectional view of the variable aperture nozzle 176 in the fully open position 166. FIG. 19 shows the variable aperture nozzle 176 in the choked position 168. FIG. 20 is a side sectional view of the variable aperture nozzle 176 in the choked position 168. When the variable aperture nozzle 176 is commanded by the controller 200 to change the size of the valve opening, the leaves 174 of the iris diaphragm valve 172 may each pivot by the same amount which advantageously results in the valve opening remains centered relative to the cross-sectional center of the conduit, regardless of the size of the valve opening.

FIGS. 14-20 illustrate two examples of a variety of valve configurations in which the valve opening remains centered within the fluid conduit 120 regardless of the size of the valve opening. By maintaining the upstream valve opening 162 centered when the upstream valve 160 is in a choked position 168, the flow of cryogenic fluid 108 through the upstream valve 160 is centered within the fluid conduit 120, while the upstream valve 160 simultaneously impedes or blocks movement of the peripherally-located buoyant flow 112 in the upstream direction 136 past the upstream valve 160, which thereby avoids heat loss from the cryogenic fluid 108 within the heat transfer zone 152, and improves the heating efficiency of the heating mechanism 150.

Referring again to FIG. 2, the system 100 includes the controller 200 which is communicatively coupled to the upstream valve 160, the downstream valve 182, and may additionally be communicatively coupled to the heating mechanism 150. The controller 200 may be part of a computer system (e.g., ground-based or vehicle-based) configured to control the upstream valve 160, the downstream valve 182, and the heating mechanism 150 without human intervention or monitoring. In an embodiment, the controller 200 is configured to adjust the upstream valve 160 to a choked position 168 at which: (1) the upstream-valve non-buoyant mass flow rate substantially matches the downstream-valve mass flow rate and, (2) the upstream valve 160 at least partially impedes, blocks, or prevents the buoyant flow 112 from flowing in an upstream direction 136 past the upstream valve 160. Partial blocking of the buoyant flow 112 by the upstream valve 160 in the choked position 168 may include reducing (e.g., by at least 50 percent) the amount of buoyant flow 112 moving past the upstream valve 160 and out of the heat transfer zone 152 relative to the amount of buoyant flow 112 that otherwise would flow out of the heat transfer zone 152 and possibly out of the conduit upstream end 124 without the existence of the upstream valve 160. As indicated above, the upstream valve 160 in the choked position 168 advantageously reduces or prevents the buoyant flow 112 from drawing a portion of heated main flow 110 of cryogenic fluid 108 in an upstream direction 136 past the upstream valve 160, which would undesirably reduce the heating efficiency of the heating mechanism 150.

Referring to FIGS. 2-3, the system 100 may include an upstream flowmeter 202, a downstream flowmeter 204, and/or a temperature sensor 206. The upstream flowmeter 202 may be configured to measure the upstream-valve non-buoyant mass flow rate of the cryogenic fluid 108 passing in the downstream direction 138 through the upstream valve opening 162 of the upstream valve 160. The downstream flowmeter 204 may be configured to measure the downstream-valve mass flow rate of the cryogenic fluid 108 passing in the downstream direction 138 through the downstream valve opening 184 of the downstream valve 182. The upstream flowmeter 202 and/or the downstream flowmeter 204 may be configured as a venturi flowmeter, a turbine flowmeter, a ultrasonic flowmeter, a differential pressure flowmeter, or any one of a variety of other types of mass flow meters.

The controller 200 may receive data from the upstream flowmeter 202 and the downstream flowmeter 204 respectively representative of the upstream-valve mass flow rate and the downstream-valve mass flow rate of the cryogenic fluid 108. As mentioned above, the downstream-valve mass flow rate may represent the mass flow rate of cryogenic fluid 108 passing through the downstream valve 182. Alternatively, the downstream-valve mass flow rate may represent the mass flow rate of cryogenic fluid 108 exiting the conduit downstream end 128, or the mass flow rate of cryogenic fluid 108 at any location in the downstream portion 126 of the fluid conduit 120 between the downstream valve 182 and the conduit downstream end 128. In a still further embodiment, the downstream-valve mass flow rate may represent the mass flow rate of cryogenic fluid 108 at any location downstream of the downstream valve 182, including any location downstream of the conduit downstream end 128. In response to receiving data representative of the downstream-valve mass flow rate, the controller 200 may automatically (e.g., without human intervention) adjust the upstream valve 160 (e.g., to a choked position 168) such that the movement of the buoyant flow 112 past the upstream valve 160 is impeded, relative to the buoyant flow 112 that would otherwise flow (e.g., along with entrained main flow 110) out of the conduit upstream end 124 without the existence of the upstream valve 160.

In this regard, the controller 200 may initially adjust a size of the upstream valve opening 162 from a fully open position 166 to a choked position 168 which may be described as a partially open position for an initially low mass flow rate of cryogenic fluid 108. In the example of the launch vehicle 300 (FIGS. 22-23) described in greater detail below, in response to a command from an external system (not shown), the controller 200 may adjust the size of the upstream valve opening 162 and downstream valve opening 184 based on engine start box requirements. As described below, when the actual cryogenic fluid temperature is heated to a desired cryogenic fluid temperature per engine start box requirements, the downstream valve 182 and upstream valve 160 are each moved from the choked position 168 to the fully open position 166 to facilitate an increase in the mass flow rate of cryogenic fluid 108 to the rocket engine 310. With the upstream valve 160 and downstream valve 182 in the fully open position 166, any warmed cryogenic fluid 108 that would otherwise be drawn upstream by the buoyant flow 112 under the initially low mass flow rate becomes entrained or mixed with the downstream-moving cryogenic fluid 108 under the increased mass flow rate, such that it is no longer necessary to maintain the upstream valve 160 in the choked position 168 to block the buoyant flow 112.

The temperature sensor 206 is configured to measure an actual cryogenic fluid temperature of the cryogenic fluid 108 at the downstream portion 126 of the fluid conduit 120 such as at the downstream valve 182 or at the conduit downstream end 128. The temperature sensor 206 may be mounted or coupled to, located in, or otherwise associated with the fluid conduit 120 in a manner enabling the temperature sensor 206 to measure the actual cryogenic fluid temperature of the cryogenic fluid 108, and transmit data representative of the actual cryogenic fluid temperature to the controller 200. The controller 200 is configured to receive the data representative of the actual cryogenic fluid temperature and, based on the temperature data, control the heat 158 output of the heating mechanism 150 in a manner maintaining the actual cryogenic fluid temperature substantially at or within a predetermined range (e.g., within 20%) of the desired cryogenic fluid temperature. In the example of a rocket engine 310, the controller 200 may be configured to adjust the heat 158 output of the heating mechanism 150 such that the actual cryogenic fluid temperature is maintained within a desired range (e.g., ±2 degrees R) of the desired cryogenic fluid temperature, per engine start box requirements. The start box requirements may be described as a range (e.g., a maximum and minimum) of the temperature and pressure of the propellants for engine ignition.

Alternatively, for the system 100 configuration where the heating mechanism 150 comprises environmental heating 159 (FIG. 3) of the lengthwise section of the fluid conduit 120 in the heat transfer zone 152 having reduced thermal insulation 156 (FIG. 3) or no thermal insulation 156, the controller 200 may adjust the upstream valve 160 to a choked position 168 that results in an upstream-valve mass flow rate that allows the environmental heating 159 to maintain the actual cryogenic fluid temperature substantially at the desired cryogenic fluid temperature. For example, if the actual cryogenic fluid temperature (e.g., as measured by the temperature sensor 206) rises above the desired cryogenic fluid temperature, the controller 200 may increase the size of the upstream valve opening 162 which may have the effect of allowing more buoyant flow 112 to escape past the upstream valve 160 in the upstream direction 136, reducing the amount of heat that gets mixed into the cryogenic fluid 108 in the downstream direction 138, and thus reducing the temperature of the cryogenic fluid 108 as measured by the temperature sensor 206. Conversely, if the actual cryogenic fluid temperature falls below the desired cryogenic fluid temperature, the controller 200 may decrease the size of the upstream valve opening 162 which may have the effect of reducing the amount of buoyant flow 112 that escapes past the upstream valve 160 in the upstream direction 136, increasing the amount of heat that gets mixed into the cryogenic fluid 108 in the downstream direction 138, and thus increasing the temperature of the cryogenic fluid 108 as measured by the temperature sensor 206.

Referring to FIG. 2, as mentioned above, the controller 200 is configured to automatically control the downstream valve 182 to adjust (e.g., reduce) the size of the downstream valve opening 184 to a choked position 168 that meets a desired downstream-valve mass flow rate of the cryogenic fluid 108, and which may result in an increase in the velocity of the cryogenic fluid 108 through the heat transfer zone 152. In addition, the upstream valve 160 may be a variable-opening valve 164 having a centrally located upstream valve opening 162 which causes the cryogenic fluid 108 to flow into and/or through the heat transfer zone 152 as a generally centered main flow 110. The increased velocity of the generally centered main flow 110 may cause the peripherally-located and slower moving buoyant flow 112 to become entrained or mixed within the main flow 110, which increases the temperature of the cryogenic fluid 108 and thereby increases the efficiency at which the heating mechanism 150 heats the cryogenic fluid 108. The increased heating efficiency allows the controller 200 to reduce the heat 158 output of the heating mechanism 150 and/or allows for a reduction in the quantity and/or heat-output-rating of the heating devices 154.

When the controller 200 is commanded (e.g., via preprogramming or via manual command from an external command system) to increase the flow rate once the desired cryogenic fluid temperature is reached (e.g., the start box temperature at the engine interface 312 of a rocket engine 310), the controller 200 may deactivate the heating mechanism 150, and the controller 200 may adjust the downstream valve 182 and the upstream valve 160 to the fully open position 166. Because the heating mechanism 150 is deactivated and because the flow rate is increased, any warm cryogenic fluid 108 that would otherwise turn into buoyant flow 112 instead becomes entrained within the faster moving main flow 110 moving in the downstream direction 138, such that there is no longer a need for the upstream valve 160 to block the flow of buoyant flow 112. The upstream valve 160 and downstream valve 182 may be moved to the fully open position 166 to allow full flow of cryogenic fluid 108 to the rocket engine 310 while the heating mechanism 150 remains deactivated or is operated in a manner such that little or no heat 158 is applied to the cryogenic fluid 108.

Figure 21:
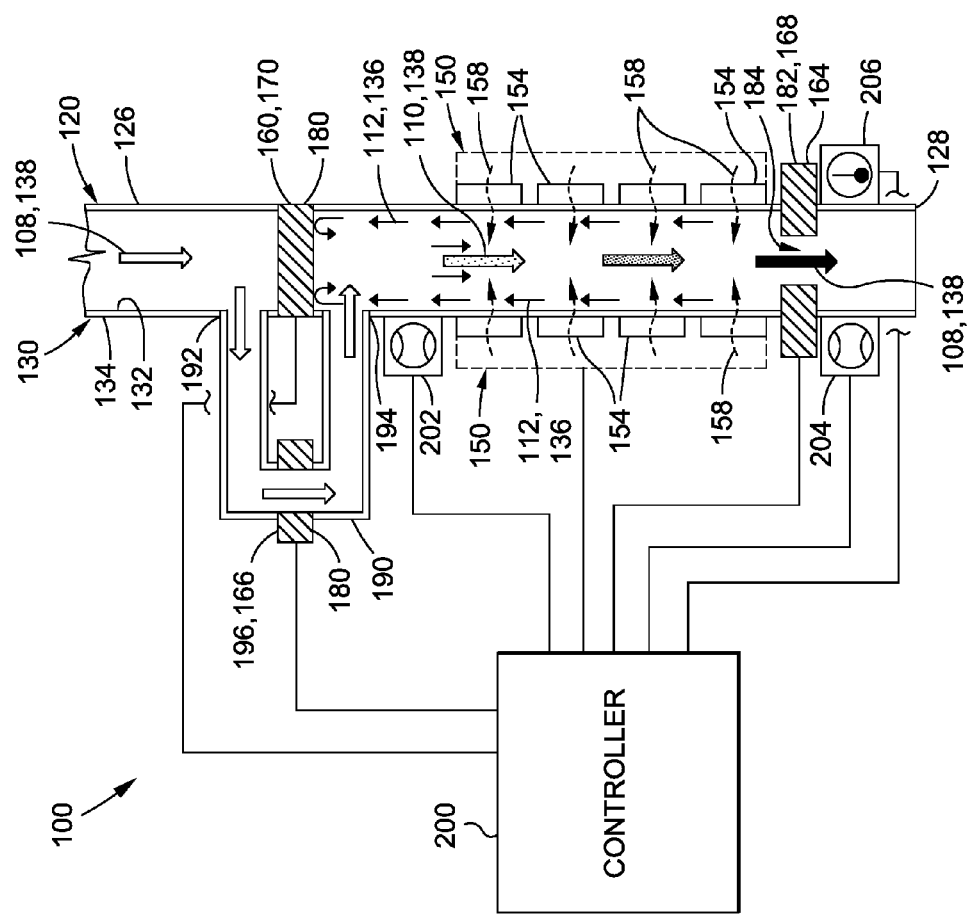
FIG. 21 is a schematic view of an example of a fluid conduit wherein the presently-disclosed system further includes a bypass valve mounted on a bypass leg in parallel with the upstream valve.

FIG. 21 is a schematic view of an example of the presently-disclosed system 100 wherein the fluid conduit 120 includes a bypass valve 196 mounted on a bypass leg 190 arranged in parallel with the upstream valve 160. The bypass leg 190 has a bypass leg upstream end 192 and a bypass leg downstream end 194. The bypass leg upstream end 192 is fluidly coupled to the fluid conduit 120 at a location immediately upstream of the upstream valve 160. The bypass leg downstream end 194 is fluidly coupled to the fluid conduit 120 at a location immediately downstream of the upstream valve 160. The upstream valve 160 and/or the bypass leg 190 may be configured as an open-close valve 180 that is movable either to a fully open position 166 or to a fully closed position 170, and is non-adjustable to a choked position 168. As indicated above, an open-close valve 180 may be less complex and therefore less costly and simpler to operate than a variable-opening valve 164. Alternatively, the upstream valve 160 and/or the bypass leg 190 may be provided as a variable-opening valve 164 that may be operated as an open-close valve 180 wherein the variable-opening valve 164 is movable to either a fully open position 166 or a fully closed position 170.

In the system 100 embodiment of FIG. 21, the controller 200 may receive data representative of the downstream-valve mass flow rate, and automatically adjust the upstream valve 160 to the fully closed position 170 and adjust the bypass valve 196 to the fully open position 166, causing the cryogenic fluid 108 upstream of the upstream valve 160 to be diverted into the bypass leg 190 and re-enter the fluid conduit 120 immediately downstream of the upstream valve 160. Advantageously, the fully closed upstream valve 160 forms a barrier to any buoyant flow 112 that forms within the heat transfer zone 152, and thereby prevents heat loss that would otherwise occur if the buoyant flow 112 were able to move past the upstream valve 160.

In FIG. 21, in some examples, the bypass leg 190 may have a cross-sectional area that is sized complementary to the required downstream-valve mass flow rate for an initially low mass flow. For example, in the example of the launch vehicle 300 (FIGS. 22-23) described below, the cross-sectional area of the bypass leg 190 may be based on the required downstream-valve mass flow rate for engine thermal conditioning prior to engine start. Just prior to engine ignition, the bypass valve 196 is moved to the fully closed position 170 and the downstream valve 182 and upstream valve 160 are moved to the fully open position 166 to facilitate an increase in the mass flow rate, allowing full flow of cryogenic propellant to the rocket engine 310. With the upstream valve 160 and the downstream valve 182 in the fully open position 166 and the cryogenic fluid 108 flowing at the increased mass flow rate, any warmed cryogenic fluid 108 that would otherwise move upstream under the initially low mass flow rate now mixes with the increased-velocity, downstream-moving cryogenic fluid 108, such that it is no longer necessary to maintain the upstream valve 160 in the closed position for the purpose of blocking buoyant flow 112.

FIG. 22 shows an example of a launch vehicle 300 for launching a payload 302 into space such as into Earth orbit. The launch vehicle 300 has an engine section including a liquid propellant rocket engine 310 having a combustion chamber 314 and an engine nozzle 316. In addition, the launch vehicle 300 has a pair of cryogenic propellant tanks 304 including a fuel tank 308 and an oxidizer tank 306. The fuel tank 308 may contain cryogenic fuel such as liquid hydrogen (LH$_2$). The oxidizer tank 306 may contain oxidizer such as liquid oxygen (LOX). A fluid conduit 120 fluidly couples the oxidizer tank 306 to the engine section of the rocket engine 310, and another fluid conduit 120 fluidly couples the fuel tank 308 to the engine section of the rocket engine 310.

In FIG. 23, the downstream portion 126 of each one of the fluid conduits 120 is shown including an upstream valve 160 and a heating mechanism 150 located within the heat transfer zone 152. Although FIG. 23 illustrates a downstream valve 182 mounted to the fluid conduit immediately downstream of the heating mechanism 150, the downstream valve 182 may comprise one or more valves (not shown) located downstream of the conduit downstream end 128. For example, the downstream valve 182 may comprise a combination of valves (not shown) in the rocket engine 310 and/or one or more valves (not shown) located downstream of the rocket engine 310 such as an engine bleed system valve (not shown) of a ground system, as mentioned above.

In the example of FIG. 23, the downstream portion 126 of each fluid conduit 120 is fluidly coupled to the engine section of the rocket engine 310. For example, the conduit downstream end 128 may be fluidly coupled to a pump (not shown) such as turbopump, to a combustion chamber 314 or pre-combustion chamber, or to another engine component. The heating mechanism 150 is configured to heat the cryogenic fluid 108 (e.g., LH$_2$, LOX) as the cryogenic fluid 108 flows through the heat transfer zone 152. For example, LOX flowing from the oxidizer tank 306 may initially enter the engine section at a temperature of 163 R, flowing at an engine bleed mass flow rate of 2 lbm/s. However, engine start box requirements necessitate that the LOX enters the engine section at a temperature of 168 R. To increase the temperature of the LOX by 5 R from 163 R to 168 R, 5 BTU/sec of heat must be applied to the LOX. The heat 158 may be applied using external heating devices 154 located along the heat transfer zone 152. The heating devices 154 may be activated for a period of time (e.g., approximately 1 hour) prior to engine start.

As the heating devices 154 warm a layer of LOX in contact with the conduit inner surface 132 within the heat transfer zone 152, the warmed layer of LOX has a tendency to move upstream as a buoyant flow 112. A remaining portion or main flow 110 of the heated LOX is drawn down into the engine section due to the engine bleed flow. Without preventing heat loss from the main flow 110 due to the buoyant flow 112, the heating devices 154 may have a heating inefficiency on the order of 20-80 percent, based on the ratio of the engine bleed mass flow rate divided by the power of the heating devices 154. For the above-described example wherein 5 BTU/sec is required to increase the temperature of the LOX by 5 R, a 20-80 percent heating inefficiency corresponds to 6.25-25 BTU/sec of total power that must be applied to the fluid conduit 120. Stated another way, 1.25-5 times more power is required to heat the LOX than would otherwise be required if there were no heat loss due to buoyant flow 112. As mentioned above, heat loss due to buoyant flow 112 may also undesirably reduce the density of the bulk LOX in the oxidizer tank 306, resulting in a reduction in the available propellant mass for the launch vehicle 300, and a corresponding reduction in the amount of payload 302 that can be launched into orbit.

Advantageously, the presently-disclosed system 100 reduces or prevents heat loss from the LOX by blocking the buoyant flow 112 using the upstream valve 160 located immediately upstream of the heating mechanism 150. For example, the presently-disclosed system 100 includes the upstream valve 160 and the downstream valve 182, each of which may initially be in a fully open position 166. Upon activating the heating devices 154 to initiate heating of the LOX, the controller 200 also commands the downstream valve 182 to move from a fully open position 166 to a choked position 168 corresponding to the engine bleed mass flow rate. In addition, the controller 200 commands the upstream valve 160 to move from the fully open position 166 to a choked position 168 at which an upstream-valve non-buoyant mass flow rate substantially matches (e.g., within 30 percent) a downstream-valve mass flow rate.

Adjusting the upstream valve 160 to the choked position 168 increases the velocity of the LOX flowing through the upstream valve 160. The increase in the velocity of the LOX reduces or prevents the buoyant flow 112 from moving past the upstream valve 160, significantly improving the heating efficiency of the heating devices 154. In addition, the underside of the partially open upstream valve 160 may impede or block upstream movement of at least a portion of the buoyant flow 112. In examples where the mass flow rates allow, the upstream valve 160 may be adjusted to a choked position 168 that completely blocks all buoyant flow 112 which, in the above-described example, would increase the heating efficiency by 1.25-5 times. Furthermore, heating of the LOX from environmental sources (e.g., radiative heating from nearby components), which is otherwise lost due to buoyant flow 112, would become trapped within the heat transfer zone 152, further improving the heating efficiency. The overall improvement in heating efficiency allows the 5 R temperature increase of the LOX to be achieved with reduced power output of the heating devices 154, or the same power output may be used with fewer heating devices 154.

Figure 24:
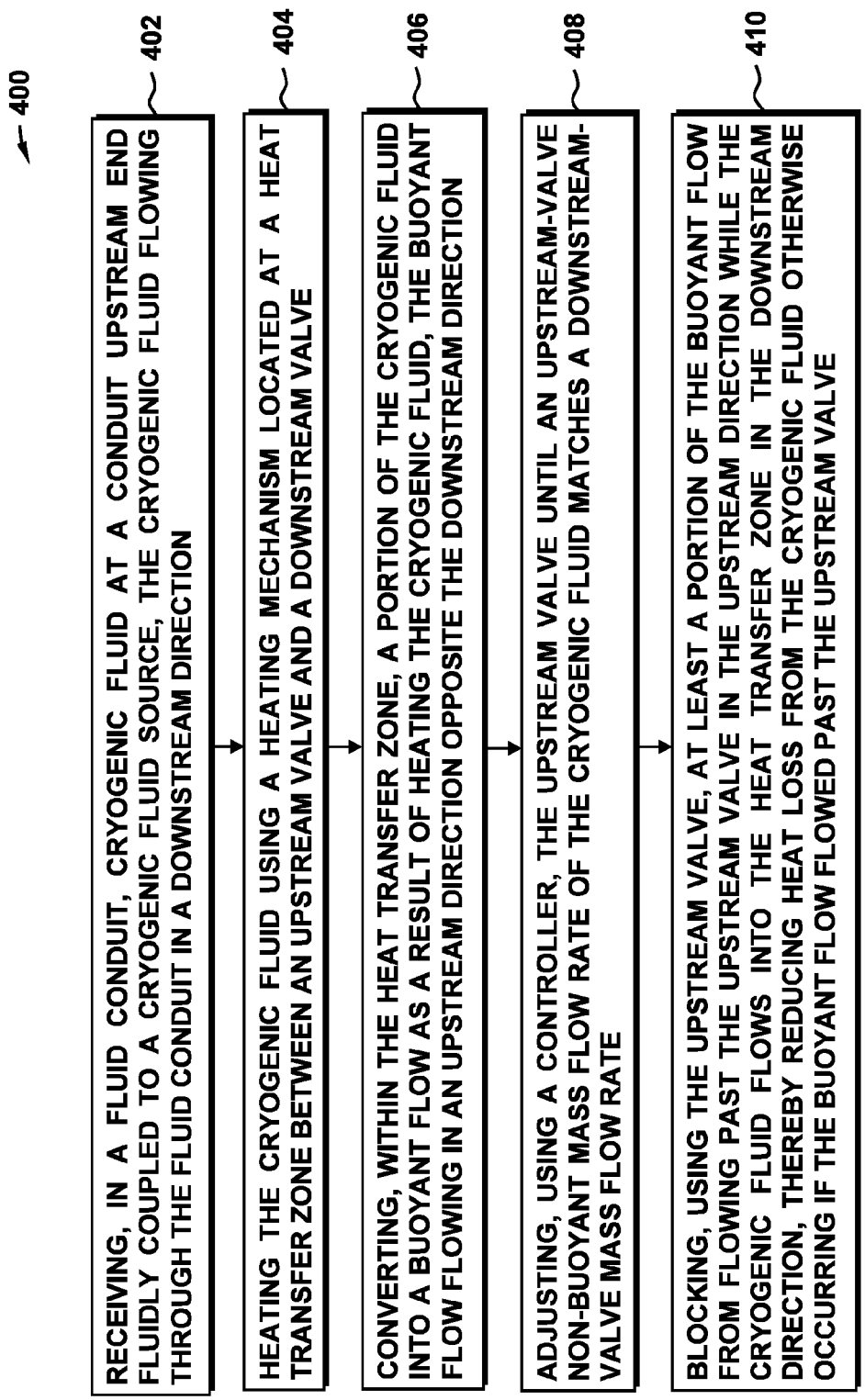
FIG. 24 is a flowchart having one or more operations that may be included in a method of increasing the efficiency of heating cryogenic fluid flowing through a fluid conduit.
Figure 25:
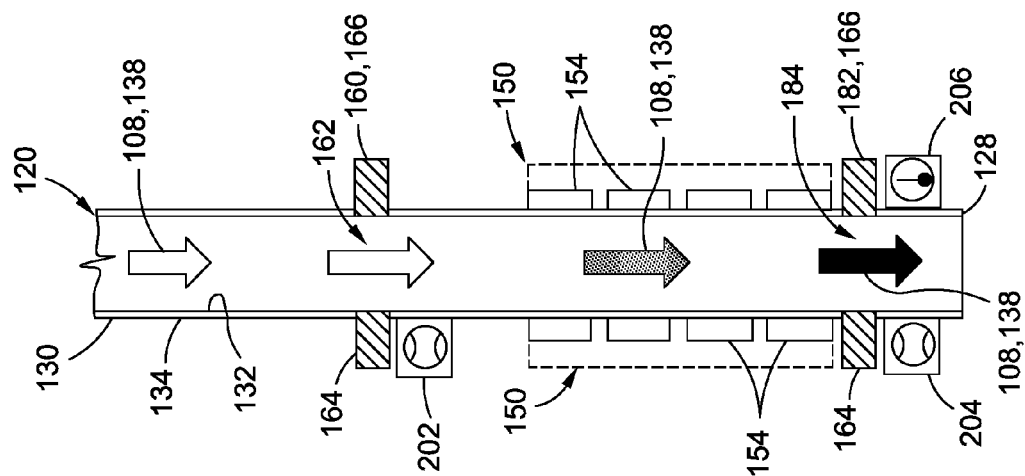
FIG. 25 is a schematic view of an example of a fluid conduit wherein the heating mechanism is comprised of one or more powered heating devices, and further illustrating the upstream valve in the fully open position, the downstream valve in the choked position, and the heating devices in a deactivated state.
Figure 26:
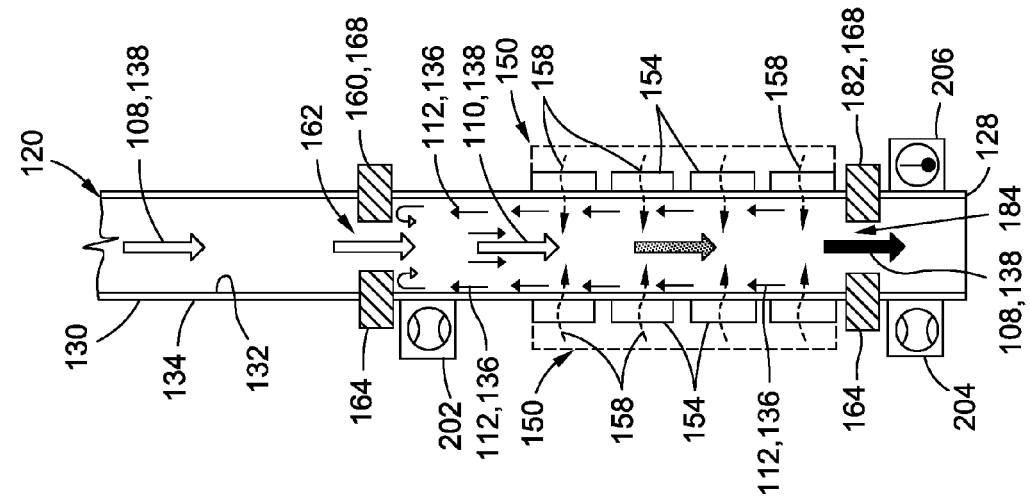
FIG. 26 is a schematic view of the fluid conduit of FIG. 25 illustrating the heating devices activated to heat the cryogenic fluid, and further illustrating the upstream valve adjusted to a choked position such that the upstream-valve non-buoyant mass flow rate of the cryogenic fluid through the upstream valve substantially matches the downstream-valve mass flow rate of the cryogenic fluid through the downstream valve.
Figure 27:
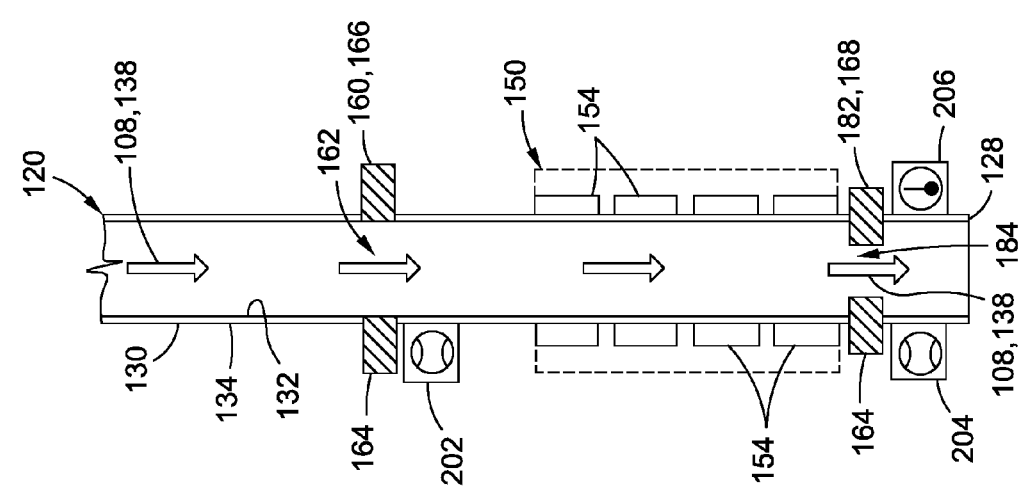
FIG. 27 is a schematic view of the fluid conduit of FIG. 25 illustrating the heating devices deactivated upon the cryogenic fluid reaching a desired downstream cryogenic fluid temperature, and further illustrating the upstream valve and the downstream valve moved to a fully open position to facilitate an increase in the mass flow rate of the cryogenic fluid.

Referring to FIG. 24 and with additional reference to FIGS. 25-27, shown in FIG. 24 is a flowchart having one or more operations that may be included in a method 400 of increasing the efficiency of heating cryogenic fluid 108 flowing through a fluid conduit 120. The method 400 is described in the context of a rocket launch application (e.g., FIGS. 22-23) and, more particularly, in the context of heating cryogenic fluid 108 (e.g., cryogenic oxidizer or cryogenic fuel) in preparation for starting a rocket engine 310 using the presently-disclosed system 100 which includes a controller 200 (e.g., FIG. 2), an upstream valve 160, a downstream valve 182, and a heating mechanism 150 located within the heat transfer zone 152 between the upstream valve 160 and downstream valve 182. FIG. 25 shows an example of the heating mechanism 150 comprised of a plurality of powered heating devices 154.

In the method 400 of FIG. 24, the upstream valve 160 (FIG. 25) may initially be in the fully open position 166. The downstream valve 182 (FIG. 25) may be automatically adjusted by the controller 200 to a choked position 168 that meets a desired downstream-valve mass flow rate of the cryogenic fluid 108 through the downstream valve 182. In some examples, the controller 200 may adjust the downstream valve 182 based on the launch phase in a preprogrammed launch procedure. In other examples, the controller 200 may be manually commanded to adjust the downstream valve 182 to the choked position 168. The choked position 168 of the downstream valve 182 may be such that the downstream-valve mass flow rate is substantially equivalent to the engine bleed flow. The heating mechanism 150 (FIG. 25) may be in a state (e.g., a deactivated state) such that little or no heat 158 is provided by the heating mechanism 150 to the cryogenic fluid 108 passing through the heat transfer zone 152.

Step 402 of the method 400 includes receiving, in the fluid conduit 120, cryogenic fluid 108 at the conduit upstream end 124 which is fluidly coupled to a cryogenic fluid source 102 such as a cryogenic propellant tank 304. As shown in FIG. 25, the cryogenic fluid 108 flows through the fluid conduit 120 in a downstream direction 138 under an acceleration force 140 (e.g., gravitational force) toward the conduit downstream end 128 and into a cryogenic fluid receiving component 114, such as the engine section of a rocket engine 310 (FIG. 23).

Step 404 of the method 400 includes heating the cryogenic fluid 108 using the heating mechanism 150 located within the heat transfer zone 152. The heating of the cryogenic fluid 108 may include heating the cryogenic fluid 108 using one or more powered heating devices 154 that may be mounted on or positioned in close proximity to the fluid conduit 120, as mentioned above. FIG. 26 shows a plurality of heating devices 154 emitting, radiating, or otherwise applying heat 158 to the conduit wall 130 of the fluid conduit 120 which results in heating of the cryogenic fluid 108. However, instead of or in addition to active heating, the heating of the cryogenic fluid 108 may be performed passively using environmental heating 159 including radiative heating, ambient air heating, or any other type of passive heating. For example, as mentioned above, passive heating of the conduit outer surface 134 along the heat transfer zone 152 may occur due to reduced or non-existent thermal insulation 156 on the conduit outer surface 134 within the heat transfer zone 152. The remaining portion of the fluid conduit 120 outside of the heat transfer zone 152 may be at least partially covered with thermal insulation 156 to reduce or prevent environmental heating 159 of the cryogenic fluid 108 upstream of the upstream valve 160, thereby reducing or preventing the occurrence of buoyant flow 112 upstream of the upstream valve 160.

Step 406 of the method 400 includes converting, within the heat transfer zone 152, a portion of the cryogenic fluid 108 into the buoyant flow 112 as a result of heating the cryogenic fluid 108 within the heat transfer zone 152. FIG. 26 illustrates the buoyant flow 112 that naturally forms along the conduit inner surface 132 of the conduit wall 130 within the heat transfer zone 152 due to the heating of the cryogenic fluid 108 immediately adjacent to the conduit inner surface 132, as mentioned above. Due to the reduced density of the warmer buoyant flow 112 relative to the density of the cooler main flow 110 of cryogenic fluid 108 nearer the center of the fluid conduit 120, the buoyant flow 112 moves along the conduit inner surface 132 in an upstream direction 136 toward the upstream valve 160. The main flow 110 of cryogenic fluid 108 moves in the downstream direction 138 toward the conduit downstream end 128.

Step 408 of the method 400 includes adjusting, using the controller 200, the upstream valve 160 to a choked position 168 at which an upstream-valve non-buoyant mass flow rate of the cryogenic fluid 108 through the upstream valve 160 substantially matches a downstream-valve mass flow rate of the cryogenic fluid 108 through the downstream valve 182. In FIGS. 25-27, the upstream valve 160 and the downstream valve 182 are each configured as a variable-opening valve 164 having a respective upstream valve opening 162 and downstream valve opening 184 that is adjustable between a fully open position 166, a fully closed position 170, and a choked position 168 (e.g., FIG. 26). The controller 200 may be programmed to adjust the upstream valve 160 to a choked position 168 substantially simultaneous with the activation or powering up of the heating mechanism 150, or within several minutes before or after activation of the heating mechanism 150.

The method 400 may additionally include measuring, using an upstream flowmeter 202 and a downstream flowmeter 204, the respective upstream-valve mass flow rate and downstream-valve mass flow rate of the cryogenic fluid 108 flowing in the downstream direction 138 respectively through the upstream valve opening 162 of the upstream valve 160 and through the downstream valve opening 184 of the downstream valve 182. As indicated above, the upstream flowmeter 202 and the downstream flowmeter 204 may each transmit data representative of the upstream-valve mass flow rate and the downstream-valve mass flow rate to the controller 200 which uses the data to adjust the size of the upstream valve opening 162 such that the upstream-valve non-buoyant mass flow rate substantially matches the downstream-valve mass flow rate, and such that the upstream valve 160 in the choked position 168 results in the blockage of at least a portion of the buoyant flow 112 from flowing in an upstream direction 136 past the upstream valve 160.

Step 410 of the method 400 includes impeding, preventing, or blocking, using the upstream valve 160, at least a portion of the buoyant flow 112 from moving past the upstream valve 160 in the upstream direction 136 while the main flow 110 of cryogenic fluid 108 flows in the downstream direction 138 though the choked upstream valve 160 and into the heat transfer zone 152. FIG. 26 illustrates the upstream valve 160 at least partially blocking the buoyant flow 112 while the heating devices 154 continue to apply heat 158 to the cryogenic fluid 108. The method 400 may include maintaining the upstream valve opening 162 centered within the fluid conduit 120 such that an annular-shaped downstream side (not shown) of the choked upstream valve 160 at least partially blocks the buoyant flow 112. In addition, the cryogenic fluid 108 passing through the upstream valve 160 in the choked position 168 may be moving at an increased velocity relative to the cryogenic fluid 108 velocity when the upstream valve 160 is in the fully open position. The increased velocity of the cryogenic fluid 108 may facilitate entrainment or mixing of the warmer buoyant flow 112 with the cooler cryogenic fluid 108 entering the heat transfer zone 152, and may cause the buoyant flow 112 to reverse direction and start flowing along the downstream direction 138 adding to the heating of the cryogenic fluid 108. In some examples, the controller 200 may operate in a closed-loop manner wherein the controller 200 continuously receive data representative of the upstream-valve mass flow rate and the downstream-valve mass flow rate from the respective upstream flowmeter 202 and the downstream flowmeter 204, and continuously adjusts the size of the upstream valve opening 162 such that the upstream-valve non-buoyant mass flow rate is substantially equivalent to the downstream-valve mass flow rate.

The method 400 may additionally include monitoring or measuring, using a temperature sensor 206, an actual cryogenic fluid temperature of the cryogenic fluid 108. For example, the temperature sensor 206 may be configured to measure the actual cryogenic fluid temperature immediately downstream of the downstream valve 182, or at the conduit downstream end 128. The temperature sensor 206 may transmit data representative of the actual cryogenic fluid temperature to the controller 200. The controller 200 may receive the data representative of the actual cryogenic fluid temperature, and may control the heat 158 output of the heating mechanism 150 in a manner increasing the temperature of the cryogenic fluid 108 until reaching a desired cryogenic fluid temperature. The desired cryogenic fluid temperature may be the engine start temperature of the cryogenic fluid 108. Upon the cryogenic fluid 108 reaching the desired cryogenic fluid temperature, the controller 200 may continue to receive temperature data from the temperature sensor 206 to allow the controller 200 to regulate the heating mechanism 150 and adjust the heat 158 output of the heating mechanism 150 such that the actual cryogenic fluid temperature is maintained temperature substantially at (e.g., within ±1 R) of the desired cryogenic fluid temperature. Alternatively, for the above-described system 100 configuration in which the heating mechanism 150 comprises environmental heating 159 (FIG. 3) of the fluid conduit 120 as opposed to active heating using heating devices 154 (FIG. 2), the controller 200 may adjust the choked position 168 of the upstream valve 160 such that the upstream-valve mass flow rate allows the environmental heating 159 to maintain the actual cryogenic fluid temperature substantially at (e.g., within 20 percent) the desired cryogenic fluid temperature.

In the example of the rocket engine 310, upon the cryogenic fluid 108 reaching the target engine start temperature, the rocket engine 310 may be started and the controller 200 may deactivate the heating mechanism 150 to halt the output of heat 158. In addition, the controller 200 may move the upstream valve 160 and the downstream valve 182 to the fully open position 166 to accommodate an increased or full mass flow rate of cryogenic fluid 108 to the engine. FIG. 27 is a schematic view of the fluid conduit 120 of FIG. 25 illustrating the heating mechanism 150 deactivated upon the cryogenic fluid 108 reaching a desired downstream cryogenic fluid temperature, and further illustrating the upstream valve 160 and the downstream valve 182 adjusted to the fully open position 166, allowing for the increased mass flow rate of the cryogenic fluid 108.

FIGS. 18-20 illustrate the operation of the system 100 embodiment having a bypass valve 196, as described above with regard to FIG. 21. FIG. 28 shows the bypass valve 196 initially in the fully closed position 170, the upstream valve 160 in the fully open position 166, and the downstream valve 182 in the choked position 168 similar to the above-described Step 402 in which cryogenic fluid 108 is received in the fluid conduit 120, and which may optionally occur prior to activation of the heating mechanism 150. The upstream valve 160 and/or the bypass leg 190 may be configured as the above-described open-close valves 180 which are movable either to a fully open position 166 or to a fully closed position 170, and are non-adjustable to a choked position 168. However, the upstream valve 160, the downstream valve 182, and/or the bypass valve 196 may be provided as a variable-opening valve 164 which may be operated as an open-close valve 180 movable between either a fully open position 166 or a fully closed position 170.

FIG. 29 shows the bypass valve 196 in the fully open position 166 and the upstream valve 160 in the fully closed position 170. Simultaneous with or shortly (e.g., within several minutes) before or after activation of the heating mechanism 150, the controller 200 may be programmed to move the bypass valve 196 to the fully open position 166 and move the upstream valve 160 to the fully closed position 170, in an operation similar to the above-described Step 408, except that the bypass leg 190 and the bypass valve 196 in the fully open position 166 may have a cross-sectional area that substantially matches the cross-sectional area of the downstream valve opening 184 in the choked position 168, thereby eliminating the need to adjust the size of the opening of the bypass valve 196. In such an arrangement, the method may include using the controller 200 to close the upstream valve 160 to block the buoyant flow 112 from moving past the upstream valve 160, and open the bypass valve 196, thereby routing the cryogenic fluid 108 through the bypass leg 190 and into the heat transfer zone 152. The heating mechanism 150 may be activated in a manner similar to the above-described Step 404 to cause heating of the cryogenic fluid 108, and resulting in the conversion of a portion of the cryogenic fluid 108 into buoyant flow 112 in a manner similar to the above-described Step 406. The closing of the upstream valve 160 blocks the buoyant flow 112 from moving past the upstream valve 160, similar to the above-described Step 410, and may result in the blocked buoyant flow 112 mixing with the cryogenic fluid 108 entering the heat transfer zone 152 from the bypass leg 190.

The method may include monitoring the actual cryogenic fluid temperature at the downstream valve 182 or at the conduit downstream end 128, depending upon the location of the temperature sensor 206, and transmitting the temperature data to the controller 200. As described above, once the cryogenic fluid 108 reaches the desired cryogenic fluid temperature from the heat applied by the heating mechanism 150, the engine may be started at which point the controller 200 may deactivate the heating mechanism 150, move the bypass valve 196 to the fully closed position 170, and move both the upstream valve 160 and the downstream valve 182 to the fully open position 166 as shown in FIG. 30 to accommodate the increased mass flow rate of the cryogenic fluid 108, thereby allowing full flow of the cryogenic fluid 108 (e.g., cryogenic oxidizer, cryogenic fuel) to the engine 310.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A system for heating cryogenic fluid, comprising:
    a fluid conduit having a conduit upstream end and a conduit downstream end, the conduit upstream end fluidly coupled to a cryogenic fluid source for receiving cryogenic fluid flowing through the fluid conduit in a downstream direction toward the conduit downstream end;
    a heating mechanism located on a downstream portion of the fluid conduit and configured to heat the cryogenic fluid, resulting in conversion of a portion of the cryogenic fluid into a buoyant flow flowing in an upstream direction;
    an upstream valve mounted to the fluid conduit at a location upstream of the heating mechanism and operable for controlling an upstream-valve mass flow rate of the cryogenic fluid, the upstream-valve mass flow rate comprising an upstream-valve non-buoyant mass flow rate of cryogenic fluid flowing through the upstream valve in the downstream direction minus an upstream-valve buoyant mass flow rate of any buoyant flow flowing past the upstream valve in the upstream direction;
    a downstream valve located downstream of the heating mechanism and operable for controlling a downstream-valve mass flow rate of the cryogenic fluid;
    a controller configured to adjust the upstream valve to a choked position at which:

the upstream-valve non-buoyant mass flow rate substantially matches the downstream-valve mass flow rate; and
the upstream valve at least partially blocks the buoyant flow from flowing in the upstream direction past the upstream valve.

2. The system of claim 1, further including:
an upstream flowmeter for measuring the upstream-valve mass flow rate of the cryogenic fluid passing through an upstream valve opening of the upstream valve along the downstream direction;
a downstream flowmeter for measuring the downstream-valve mass flow rate of the cryogenic fluid passing through a downstream valve opening of the downstream valve along the downstream direction; and
the controller configured to continuously receive data representative of the upstream-valve mass flow rate and the downstream-valve mass flow rate, and continuously adjust the upstream valve opening such that the upstream-valve non-buoyant mass flow rate substantially matches the downstream-valve mass flow rate, and the flow of the buoyant flow past the upstream valve is blocked.

3. The system of claim 1, wherein:
the upstream valve has an upstream valve opening that is non-centered relative to a center of the fluid conduit during adjustment of the upstream valve opening.

4. The system of claim 1, wherein:
the upstream valve has an upstream valve opening that remains centered relative to a center of the fluid conduit during adjustment of the upstream valve opening.

5. The system of claim 1, wherein:
at least one of the upstream valve and the downstream valve is configured as a variable-opening valve having a respective upstream valve opening and a downstream valve opening adjustable between a fully open position, a fully closed position, and at least one choked position between the fully open position and the fully closed position.

6. The system of claim 1, wherein at least one of the upstream valve and the downstream valve is configured as one of the following:
a butterfly valve;
a visor valve;
an iris diaphragm valve; and
a variable-aperture nozzle.

7. The system of claim 1, further including:
a bypass leg fluidly coupled to the fluid conduit and including a bypass valve in parallel with the upstream valve; and
the controller configured to receive data representative of the downstream-valve mass flow rate, and automatically close the upstream valve and open the bypass valve causing the cryogenic fluid to flow through the bypass leg and enter the fluid conduit in a heat transfer zone located downstream of the upstream valve.

8. The system of claim 7, wherein:
at least one of the upstream valve and the bypass leg is configured as an open-close valve being movable either to a fully open position or to a fully closed position, and being non-adjustable to a choked position.

9. The system of claim 1, wherein the heating mechanism comprises:
a powered heating device mounted to the fluid conduit and configured to actively heat the fluid conduit and/or the cryogenic fluid flowing through the fluid conduit.

10. The system of claim 1, wherein:
a majority of a conduit outer surface of the fluid conduit upstream of the upstream valve is covered with thermal insulation; and
the heating mechanism comprises:
the conduit outer surface of the fluid conduit downstream of the upstream valve is at least partially devoid of thermal insulation.

11. The system of claim 1, further including:
a temperature sensor located on a downstream portion of the fluid conduit and configured to measure an actual cryogenic fluid temperature of the cryogenic fluid;
the controller is configured to receive data representative of the actual cryogenic fluid temperature, and perform at least one of the following:
control the heating mechanism in a manner maintaining the actual cryogenic fluid temperature substantially at a desired cryogenic fluid temperature; and
adjust the upstream valve to a choked position that results in an upstream-valve mass flow rate at which the heating mechanism maintains the actual cryogenic fluid temperature substantially at the desired cryogenic fluid temperature.

12. A launch vehicle, comprising:
a cryogenic tank;
a rocket engine;
a fluid conduit configured to contain cryogenic fluid flowing in a downstream direction from the cryogenic tank to the rocket engine;
a system for heating the cryogenic fluid, the system including:
a heating mechanism located on a downstream portion of the fluid conduit and configured to heat the cryogenic fluid, resulting in conversion of a portion of the cryogenic fluid into a buoyant flow moving in an upstream direction;
an upstream valve mounted to the fluid conduit at a location upstream of the heating mechanism and operable for controlling an upstream-valve mass flow rate of the cryogenic fluid, the upstream-valve mass flow rate comprising an upstream-valve non-buoyant mass flow rate of cryogenic fluid flowing through the upstream valve in the downstream direction minus an upstream-valve buoyant mass flow rate of any buoyant flow flowing past the upstream valve in the upstream direction;
a downstream valve located downstream of the heating mechanism and operable for controlling a downstream-valve mass flow rate of the cryogenic fluid;
a controller configured to adjust the upstream valve to a choked position at which:
the upstream-valve non-buoyant mass flow rate substantially matches the downstream-valve mass flow rate; and
the upstream valve at least partially blocks the buoyant flow from flowing in the upstream direction past the upstream valve.

13. A method of heating cryogenic fluid, comprising:
receiving, in a fluid conduit, cryogenic fluid at a conduit upstream end fluidly coupled to a cryogenic fluid source, the cryogenic fluid flowing through the fluid conduit in a downstream direction toward a conduit downstream end;
heating the cryogenic fluid using a heating mechanism located within a heat transfer zone of the fluid conduit between an upstream valve and a downstream valve;

converting, within the heat transfer zone, a portion of the cryogenic fluid into a buoyant flow as a result of heating the cryogenic fluid, the buoyant flow flowing in an upstream direction;

adjusting, using a controller, the upstream valve until an upstream-valve non-buoyant mass flow rate of the cryogenic fluid through the upstream valve substantially matches a downstream-valve mass flow rate of the cryogenic fluid through the downstream valve in a choked position; and preventing, at the upstream valve, at least a portion of the buoyant flow from flowing past the upstream valve in the upstream direction while the cryogenic fluid flows into the heat transfer zone in the downstream direction, thereby reducing heat loss from the cryogenic fluid otherwise occurring if the buoyant flow flowed past the upstream valve.

14. The method of claim 13, further including:

measuring, using an upstream flowmeter and a downstream flowmeter, the respective upstream-valve mass flow rate and downstream-valve mass flow rate of the cryogenic fluid flowing in the downstream direction respectively through an upstream valve opening of the upstream valve and a downstream valve opening of the downstream valve;

continuously receiving, at the controller, data representative of the upstream-valve mass flow rate and the downstream-valve mass flow rate; and continuously adjusting, using the controller, the upstream valve opening such that the flow of the buoyant flow past the upstream valve is at least partially impeded.

15. The method of claim 13, wherein:

the upstream valve has an upstream valve opening that is non-centered relative to a center of the fluid conduit when the upstream valve is in the choked position.

16. The method of claim 13, further including:

maintaining an upstream valve opening centered relative to a center of the fluid conduit during adjustment of a size of the upstream valve opening.

17. The method of claim 13, wherein:

at least one of the upstream valve and the downstream valve is configured as a variable-opening valve having a respective upstream valve opening and a downstream valve opening adjustable between a fully open position, a fully closed position, and at least one choked position between the fully open position and the fully closed position;

the cryogenic fluid flowing unimpeded through the variable-opening valve in the fully open position; and the cryogenic fluid prevented from flowing through the variable-opening valve in the fully closed position.

18. The method of claim 13, wherein the steps of adjusting the upstream valve until the upstream-valve non-buoyant mass flow rate substantially matches the downstream-valve mass flow rate, and blocking at least a portion of the buoyant flow from flowing past the upstream valve, comprise:

closing, using the controller, the upstream valve to block the buoyant flow from flowing past the upstream valve;

opening, using the controller, a bypass valve of a bypass leg fluidly coupled to the fluid conduit in parallel with the upstream valve; and routing the cryogenic fluid through the bypass leg and into the heat transfer zone.

19. The method of claim 18, wherein:

at least one of the upstream valve and the bypass leg is configured as an open-close valve being movable either to a fully open position or to a fully closed position, and being non-adjustable to a choked position.

20. The method of claim 13, wherein the step of heating the cryogenic fluid using a heating mechanism comprises:

actively heating the cryogenic fluid using a powered heating device mounted to the fluid conduit.

21. The method of claim 13, wherein the fluid conduit outside of the heat transfer zone is at least partially devoid of thermal insulation, the step of heating the cryogenic fluid using a heating mechanism comprises:

passively heating the fluid conduit using environmental heating including at least one of radiative heating and ambient air heating.

22. The method of claim 13, further including:

measuring, using a temperature sensor located on a downstream portion of the fluid conduit, an actual cryogenic fluid temperature of the cryogenic fluid;

receiving, at the controller, data representative of the actual cryogenic fluid temperature;

performing, using the controller, at least one of the following:

controlling a heat output of the heating mechanism in a manner maintaining the actual cryogenic fluid temperature substantially at a desired cryogenic fluid temperature; and adjusting the upstream valve to a choked position resulting in an upstream-valve mass flow rate that allows the heating mechanism to maintain the actual cryogenic fluid temperature substantially at the desired cryogenic fluid temperature.

* * * * *